US008467142B2

(12) United States Patent
Sakai et al.

(10) Patent No.: US 8,467,142 B2
(45) Date of Patent: Jun. 18, 2013

(54) RECORDING MEDIUM, RECORDING/REPRODUCTION DEVICE AND METHOD FOR CONTROLLING RECORDING/REPRODUCTION DEVICE

(75) Inventors: Toshihiko Sakai, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 862 days.

(21) Appl. No.: 12/589,814

(22) Filed: Oct. 28, 2009

(65) Prior Publication Data
US 2010/0110856 A1    May 6, 2010

(30) Foreign Application Priority Data

Oct. 30, 2008    (JP) .................................. 280345/2008

(51) Int. Cl.
*G11B 5/09* (2006.01)
*G11B 5/596* (2006.01)

(52) U.S. Cl.
USPC ......................................... 360/48; 360/77.02

(58) Field of Classification Search
None
See application file for complete search history.

(56) References Cited

U.S. PATENT DOCUMENTS

| 7,623,311 B2 * | 11/2009 | Sakurai et al. ................. 360/48 |
| 2006/0198291 A1 | 9/2006 | Teguri et al. |
| 2006/0203386 A1 | 9/2006 | Soeno et al. |
| 2008/0212228 A1 * | 9/2008 | Shibano ..................... 360/77.01 |

FOREIGN PATENT DOCUMENTS

| JP | 2003-263850 A | 9/2003 |
| JP | 2009-158013 A | 7/2009 |

* cited by examiner

*Primary Examiner* — Andrew L Sniezek
(74) *Attorney, Agent, or Firm* — Edwards Wildman Palmer LLP; David G. Conlin; David A. Tucker

(57) ABSTRACT

A magnetic recording medium includes: tracks each including a magnetic recording section in which information is recorded and a non-magnetic-recording section in which no information is recorded; and nonmagnetic guide sections magnetically separating the tracks from one another. The non-magnetic-recording section is formed integrally with nonmagnetic guide sections. The magnetic recording medium includes at least one pair of a first region in which at least a portion of each of the respective non-magnetic-recording sections of first and second tracks and a portion of a magnetic recording section of a third track coincide with one another at a position along a direction in which the tracks extend; and a second region in which at least a portion of each of the respective non-magnetic-recording sections of the first and third tracks and a portion of a magnetic recording section of the second track coincide with one another at a position along the direction in which the tracks extend.

9 Claims, 12 Drawing Sheets

SPINNING DIRECTION OF MAGNETIC RECORDING MEDIUM

FIG. 4
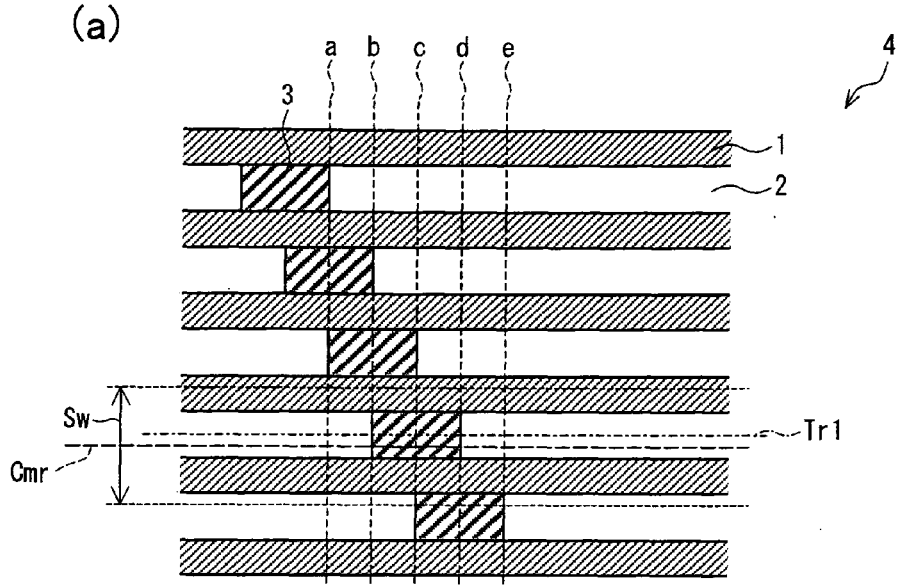
(a)
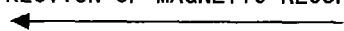
SPINNING DIRECTION OF MAGNETIC RECORDING MEDIUM
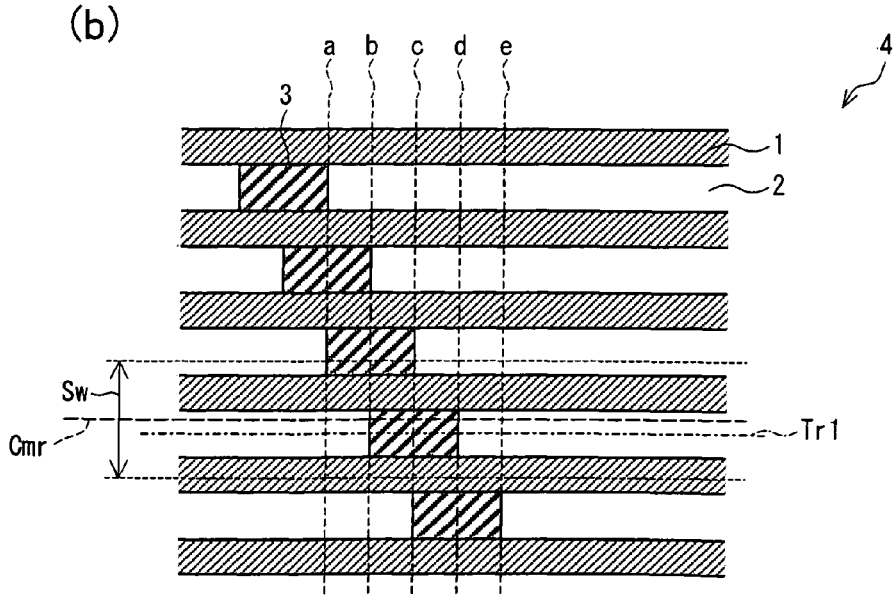
(b)
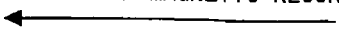
SPINNING DIRECTION OF MAGNETIC RECORDING MEDIUM

SPINNING DIRECTION OF MAGNETIC RECORDING MEDIUM

SPINNING DIRECTION OF MAGNETIC RECORDING MEDIUM

SPINNING DIRECTION OF MAGNETIC RECORDING MEDIUM

FIG. 10
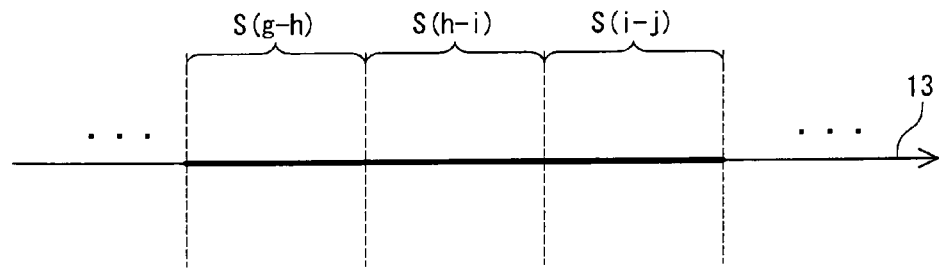
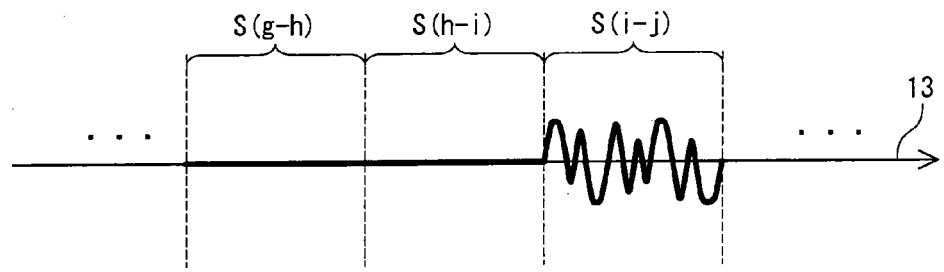
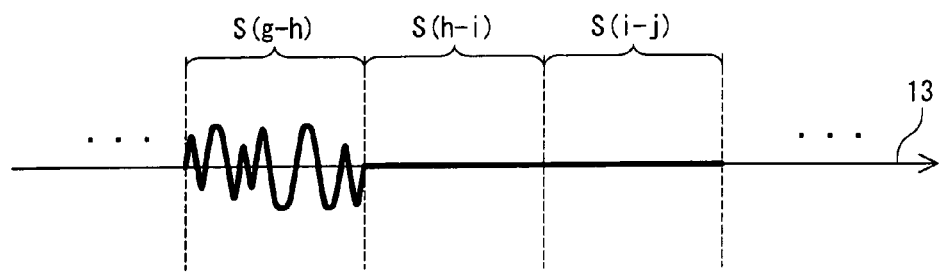

FIG. 12
(a)
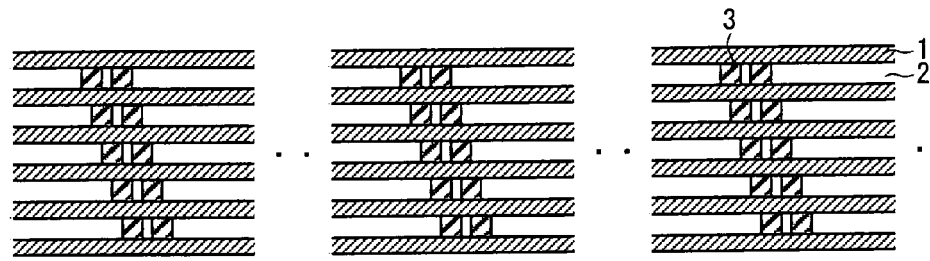
SPINNING DIRECTION OF MAGNETIC RECORDING MEDIUM
(b)
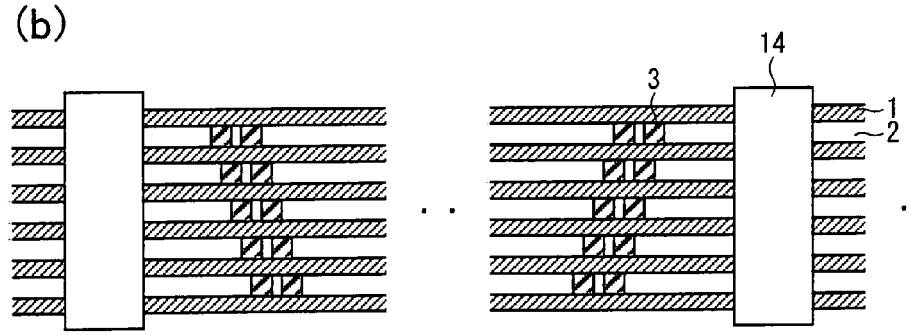
SPINNING DIRECTION OF MAGNETIC RECORDING MEDIUM

SPINNING DIRECTION OF MAGNETIC RECORDING MEDIUM

RECORDING MEDIUM, RECORDING/REPRODUCTION DEVICE AND METHOD FOR CONTROLLING RECORDING/REPRODUCTION DEVICE

This Nonprovisional application claims priority under 35 U.S.C. §119(a) on Patent Application No. 2008-280345 filed in Japan on Oct. 30, 2008, the entire contents of which are hereby incorporated by reference.

TECHNICAL FIELD

The present invention particularly relates to a magnetic recording medium, such as a discrete track medium, which is capable of high-density information recording. The present invention further relates to a magnetic recording/reproduction device capable of recording/reproducing information on the above magnetic recording medium.

BACKGROUND ART

Both still images and moving images have become of high quality in recent years. This has ever been increasing an amount of information to be handled by users. In view of this, studies have been widely conducted on how to increase an in-plane recording density, in order to advance mass storage of magnetic recording devices called hard disk drives (HDDs). One promising technique of high-density magnetic recording can be represented by a discrete track medium, which is a magnetic recording medium including magnetic recording tracks magnetically separated from one another by nonmagnetic guide sections. The discrete track medium has a configuration which almost completely prevents magnetic interaction between magnetic particles along track edges. This reduces medium noise and thus greatly improves recording density. The following further describes this point.

A magnetic layer formed uniformly (continuously) in an in-plane direction of a medium as in some conventional magnetic recording mediums causes a magnetic transition region to be formed at a boundary between recording marks on adjacent tracks. This blurs the boundary between such recording marks on adjacent tracks and thus causes noise. A smaller track pitch does not result in a smaller magnetic transition region at the boundary between recording marks on adjacent tracks, and thus causes noise to be large relative to signals. In consequence, a smaller track pitch leads to a smaller signal-to-noise ratio (S/N ratio). By contrast, in a case of a discrete track medium, which records magnetic information on its magnetic recording tracks magnetically separated from one another, a recording mark has a track edge corresponding to an edge of a magnetic recording track. This allows for achievement of a relatively high S/N ratio even when the track pitch is small, unlike in the above conventional magnetic recording mediums. As a result, discrete track mediums achieve a recording density higher than that of other conventional magnetic recording mediums.

Patent Literatures 1, 2, and 3, for example, disclose techniques for discrete track mediums described above. Patent Literature 1 discloses a discrete track medium storing information tracked by magnetic reproduction elements which are provided so as to collectively bridge a nonmagnetic portion from a magnetic recording region to another. Patent Literature 2 discloses a discrete track medium including: data signal recording regions; and tracking servo signal recording regions developed from a conventional tracking servo pattern.

In the case of Patent Literature 3, each track includes a signal gap. Detecting such a signal gap on an adjacent track allows tracking to be performed.

Patent Literature 1, in particular, requires two magnetic reproduction elements provided side by side so as to collectively bridge a nonmagnetic portion from a magnetic recording region to another. Patent Literature 1 allows for tracking by obtaining a difference between signals received by the two magnetic reproduction elements, respectively. This necessitates providing not only an element for reproducing magnetic information but also two other magnetic reproduction elements for tracking, the magnetic reproduction elements collectively bridging a nonmagnetic portion from a magnetic recording region to another.

CITATION LIST

Patent Literature 1
Japanese Patent Application Publication, Tokukai, No. 2006-244550 A (Publication Date: Sep. 14, 2006)
Patent Literature 2
Japanese Patent Application Publication, Tokukai, No. 2006-252660 A (Publication Date: Sep. 21, 2006)
Patent Literature 3
Japanese Patent Application Publication, Tokukai, No. 2003-263850 A (Publication Date: Sep. 19, 2003)

SUMMARY OF INVENTION

Technical Problem

The provision of multiple magnetic reproduction elements in a recording/reproduction head as in Patent Literature 1 unfortunately leads to an increased cost of the recording/reproduction head. In addition, since such magnetic reproduction elements detect signals electrically, the above provision also leads to increased power consumption. Thus, reproduction and tracking of magnetic information are preferably controllable using a single magnetic reproduction element.

A discrete track medium, which is a high-density magnetic recording medium, has a track pitch between adjacent tracks, the track pitch being extremely small, e.g., approximately 50 nm. This raises a concern that even a slight shift, relative to a target track, of a recording/reproduction head (a magnetic recording element and a magnetic reproduction element) included in a magnetic recording/reproduction device for recording/reproducing information on a discrete track medium likely causes a recording error and a reproduction error.

Normally, tracking control for a magnetic recording medium performed by a magnetic recording/reproduction device requires an accuracy, in positioning a recording/reproduction head, of 10% or less of the track pitch with respect to a direction along a radius of the magnetic recording medium. In view of this, an in-plane recording density of approximately 1 Tb/in$^2$ as in discrete track mediums probably requires a positioning accuracy of several nm.

To meet this requirement, signals may be detected with a tracking servo pattern more frequently so that the magnetic recording/reproduction device performs tracking control more accurately. However, simply increasing a region for forming a servo pattern in the magnetic recording medium so as to detect signals more frequently may unfortunately decrease storage of a data recording region (i.e., amount of information recordable by the magnetic recording medium).

The technique of Patent Literature 2 provides the tracking servo signal recording region as a region separate from the data signal recording region. This indicates that the technique of Patent Literature 2 may unfortunately decrease the storage of the data recording region as described above.

Also, when a magnetic recording medium includes a conventional burst pattern or a pattern developed from such a conventional burst pattern as in Patent Literature 2, the pattern being used to detect tracking error signals, a shift (in the radial direction) in a position of an edge of the pattern may unfortunately decrease tracking accuracy. This is because the edge section (along the radius) of the pattern for detecting tracking error signals corresponds to a center, along the radial direction, of a track targeted for reproduction or recording. This causes the magnetic reproduction element to be off track to a degree corresponding to the positional shift of the above edge section.

Further, a magnetic recording medium of Patent Literature 3 has a signal gap on a segmented track adjacent to a given track, the signal gap lying along a radial direction. Thus, the technique of Patent Literature 3, when a magnet head is off track with respect to a track targeted for tracking control, causes the magnet head to detect a reproduction signal from the track targeted for tracking control even when passing through the signal gap on the adjacent track. This may prevent highly accurate detection of tracking signals.

The present invention has been accomplished in view of the above problems. It is an object of the present invention to provide a recording medium enabling highly accurate detection of tracking control signals to be performed by a recording/reproduction device that records/reproduces information on a high-density recording medium such as a discrete track medium without decreasing storage of a data recording region.

It is another object of the present invention to provide a recording/reproduction device that records/reproduces information on the above recording medium, thus allowing for improvement in an accuracy of positioning a recording/reproduction head (i.e., thus causing few recording errors and few reproduction errors).

Solution to Problem

In order to attain the above objects, a recording medium of the present invention includes: a plurality of tracks evenly spaced from one another; and a separating section between the plurality of tracks, for separating the plurality of tracks from one another, each of the plurality of tracks including: a recording section for recording information therein; and a non-recording section in which no information is to be recorded; and the non-recording section being formed continuously with two of the separating sections adjacent to the track, the recording medium including at least one pair of a first region and a second region, the first region being a region in which (i) at least a portion of a non-recording section on a first track, (ii) at least a portion of a non-recording section on a second track, and (iii) a portion of a recording section formed on a third track are positioned identically at a track direction position along a circumferential direction of the recording medium, and a second region being a region in which (i) at least a portion of the non-recording section on the first track, (ii) at least a portion of a non-recording section on the third track, and (iii) a portion of a recording section formed on the second track are positioned identically at a track direction position along the circumferential direction of the recording medium, where the first track is any given one of the plurality of tracks, the second track and the third track are two tracks provided side by side with the first track.

With this arrangement, the later-described recording/reproduction device is capable of performing tracking control at the positions, along the direction in which the tracks extend, at which the non-recording sections are provided, on the basis of respective waveforms of signals detected from adjacent tracks due to an off-track state of a recording/reproduction head. In other words, the above arrangement allows feedback control to be so performed on a position, along a cross-track direction, of the recording/reproduction head that, e.g., signals detected from both the first region and the second region are at zero level, thus allowing for tracking. This eliminates the need to provide, in the above recording medium, patterns dedicated to detection of tracking control signals. This in turn allows the recording/reproduction device to accurately position the recording/reproduction head while little reducing the data regions. Further, the recording medium may include on each of its tracks a non-recording section having any appearance frequency. Higher frequency of the appearance of the non-recording sections allows the recording/reproduction device to detect tracking control signals with higher frequency.

As described above, the recording medium enables highly accurate detection of tracking control signals to be performed by a recording/reproduction device that records/reproduces information on a high-density recording medium such as a discrete track medium without reducing storage of a data recording region.

The above arrangement allows for detection of a tracking error signal on the basis of the signals that are detected from both adjacent tracks, respectively. Thus, high uniformity in the line width (width along the cross-track direction) of the separating section allows for high precision in tracking. Linear or curvilinear patterns having a uniform width, the patterns being continuously formed by, e.g., electron beam (EB) lithography, are better in line-width uniformity than that resulting from precision in relative positions of the edges of multiple patterns lying at different positions. Therefore, the above arrangement allows tracking control to be performed with higher precision.

The phrase "on track" refers to a state in which the recording/reproduction head has its cross-track position, along the cross-track direction of the recording medium, substantially coincident with the center, along its cross-track direction, of a track, so that the recording/reproduction device is able to read information stored in a target recording section. On the other hand, the phrase "off track" refers to a state reverse to the on-track state, i.e., to a state in which the recording/reproduction head has its cross-track position, along the cross-track direction of the recording medium, off the center, along the cross-track direction, of a track, so that the recording/reproduction device is unlikely to correctly read information stored in a target recording section.

Additional objects, features, and strengths of the present invention will be made clear by the description below. Further, the advantages of the present invention will be evident from the following explanation in reference to the drawings.

Advantageous Effects of Invention

The recording medium of the present invention includes: a plurality of tracks evenly spaced from one another; and a separating section between the plurality of tracks, for separating the plurality of tracks from one another, each of the plurality of tracks including: a recording section for recording information therein; and a non-recording section in which no information is to be recorded; and the non-recording section being formed continuously with two of the separating sections adjacent to the track, the recording medium including at least one pair of a first region and a second region, the first region being a region in which (i) at least a portion of a non-recording section on a first track, (ii) at least a portion of a non-recording section on a second track, and (iii) a portion of a recording section formed on a third track are positioned identically at a track direction position along a circumferential direction of the recording medium, and a second region being a region in which (i) at least a portion of the non-recording section on the first track, (ii) at least a portion of a non-recording section on the third track, and (iii) a portion of a recording section formed on the second track are positioned identically at a track direction position along the circumferential direction of the recording medium, where the first track is any given one of the plurality of tracks, the second track and the third track are two tracks provided side by side with the first track.

With this arrangement, the later-described recording/reproduction device is capable of performing tracking control at the positions, along the direction in which the tracks extend, at which the non-recording sections are provided, on the basis of respective waveforms of signals detected from adjacent tracks due to an off-track state of a recording/reproduction head. In other words, the above arrangement allows feedback control to be so performed on a position, along a cross-track direction, of the recording/reproduction head that, e.g., signals detected from both the first region and the second region are at zero level, thus allowing for tracking. This eliminates the need to provide, in the above recording medium, patterns dedicated to detection of tracking control signals. This in turn allows the recording/reproduction device to accurately position the recording/reproduction head while little reducing the data regions. Further, the recording medium may include on each of its tracks a non-recording section having any appearance frequency. Higher frequency of the appearance of the non-recording sections allows the recording/reproduction device to detect tracking control signals with higher frequency.

As described above, the present invention allows for provision of a recording medium enabling highly accurate detection of tracking control signals to be performed by a recording/reproduction device that records/reproduces information on a high-density recording medium such as a discrete track medium without decreasing storage of a data recording region.

A recording/reproduction device of the present invention includes: a recording and reproduction head including a recording element and a reproduction element for recording information and reproducing information, respectively, while following a track on a recording medium, the recording and reproduction device performing tracking control so that the recording and reproduction head is on track, in such a manner that: when the recording medium is the recording medium of the present invention, and information on a first track on the recording medium is recorded or reproduced, a tracking error signal is generated from an amplitude of a signal detected from each of the recording section formed on the third track in the first region and of the recording section formed on the second track in the second region; and a position of the recording and reproduction head is controlled so that the tracking error signal has a desired value.

With the above arrangement, the recording/reproduction device of the present invention allows tracking control to be performed with respect to the first track followed by the recording/reproduction head, on the basis of a signal detected by the reproduction element only from an adjacent track and a signal detected by the reproduction element only from the other adjacent track, which is different from the above adjacent track.

As a result, the recording/reproduction device is capable of positioning the recording/reproduction head highly accurately with respect to the recording medium even when the recording medium includes no pattern dedicated to detection of tracking control signals. Therefore, the recording/reproduction device has an improved accuracy of positioning the recording/reproduction head (i.e., causes few recording errors and few reproduction errors) by recording/reproducing information on the above recording medium.

BRIEF DESCRIPTION OF DRAWINGS

FIG. 4 is a view illustrating a state in which the recording/reproduction head is off track with respect to a track Tr1 at a time of reproducing information on the magnetic recording medium shown in FIG. 1, where (a) and (b) illustrate states in which the recording/reproduction head is slightly off track inwardly or outwardly, respectively.

FIG. 10 is a diagram schematically illustrating signals detected by a magnetic reproduction element from the magnetic recording medium shown in FIG. 8, where (a) schematically illustrates signals detected when the recording/reproduction head is on track with respect to the track Tr6; and (b) and (c) schematically illustrate signals detected when the recording/reproduction head is slightly off track inwardly or outwardly, respectively.

FIG. 12 is a view schematically illustrating an arrangement of a magnetic recording medium in accordance with an embodiment of the present invention, where (a) illustrates a magnetic recording medium including tracks each including multiple non-magnetic recording sections, and (b) illustrates a magnetic recording medium having a sector separating pattern formed on it.

DESCRIPTION OF EMBODIMENTS

Embodiment 1

An embodiment of the present invention will be described below with reference to FIGS. 1 through 5.
(Schematic Arrangement of Magnetic Recording/Reproduction Device)

Figure 2:
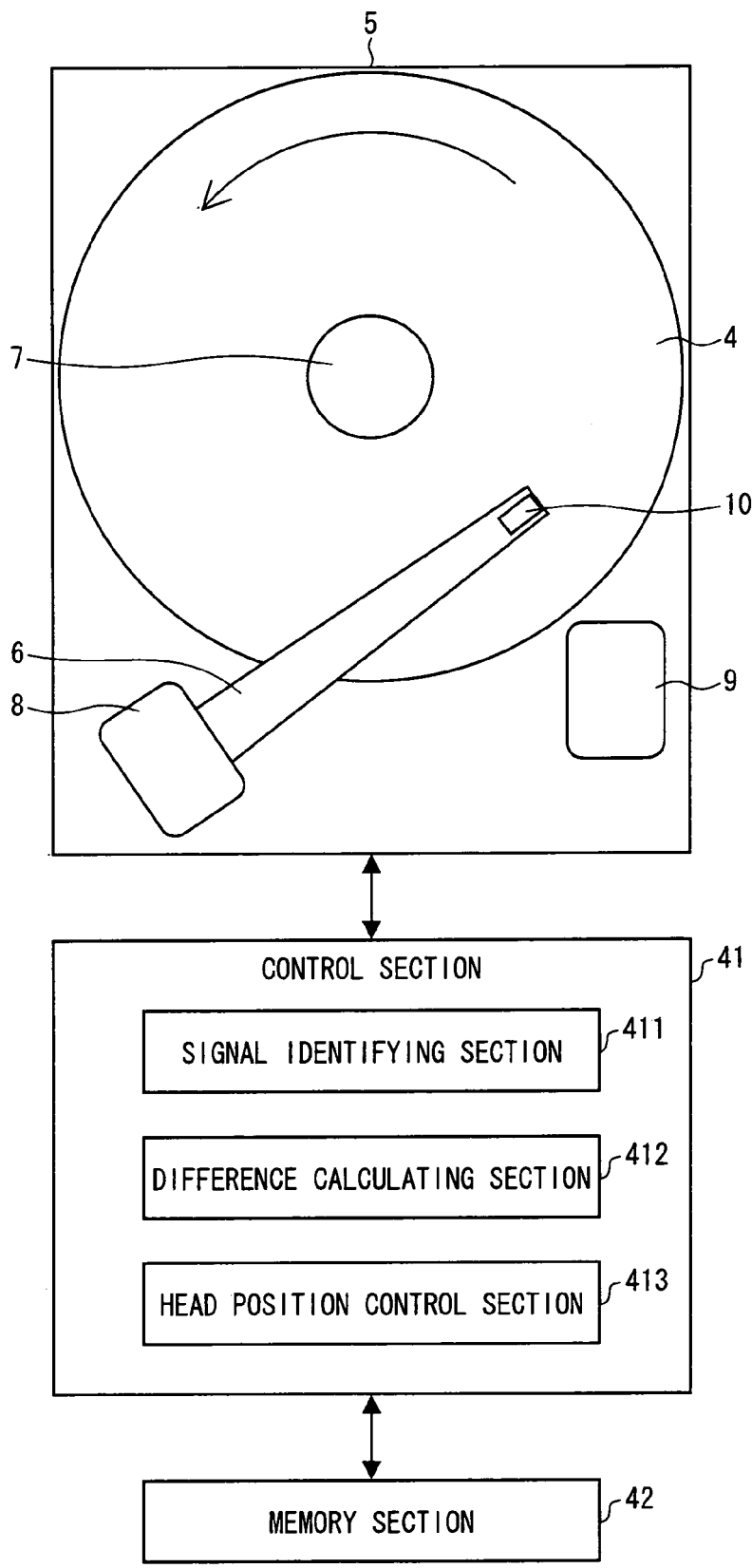
FIG. 2 is a diagram schematically illustrating an arrangement of a magnetic recording/reproduction device which records/reproduces information on the magnetic recording medium shown in FIG. 1.

FIG. 2 is a view schematically illustrating an arrangement of a magnetic recording/reproduction device 5 which records/reproduces information on a magnetic recording medium (recording medium) 4 of the present embodiment. As illustrated in FIG. 2, the magnetic recording/reproduction device 5 includes a suspension 6, a spindle 7, a voice coil motor 8, a ramp mechanism 9, and a recording/reproduction head 10. In FIG. 2, the magnetic recording/reproduction device 5 is provided with the magnetic recording medium 4. A later description will cover a structure of the magnetic recording medium 4 and how the magnetic recording/reproduction device 5 records/reproduces information on the magnetic recording medium 4.

The suspension 6 is fixed to the voice coil motor 8. The suspension 6 has a first end opposite from a second end facing the voice coil motor 8. The first end is provided with the recording/reproduction head 10, which applies magnetic fields to the magnetic recording medium 4.

The spindle 7 spins the magnetic recording medium 4 counterclockwise (as indicated by an arrow in FIG. 2) when the magnetic recording/reproduction device 5 records/reproduces information on the magnetic recording medium 4. The magnetic recording medium 4 has a hole section formed at its center, the hole section allowing the spindle 7 to fit in it.

The voice coil motor 8 moves the suspension 6 so as to cause the recording/reproduction head 10 provided on the suspension 6 to move, above the magnetic recording medium 4, in a direction of a radius of the magnetic recording medium 4 (i.e., in a cross-track direction). In other words, the recording/reproduction head 10 may change its position along the radial direction of the magnetic recording medium 4 in response to an operation of the voice coil motor 8.

The ramp mechanism 9 is provided so that the recording/reproduction head 10 can rest away from the magnetic recording medium 4 (i.e., the recording/reproduction head 10 is fixed by means of the ramp mechanism 9) when the magnetic recording/reproduction device 5 does not record/reproduce information on the magnetic recording medium 4.

Figure 3:
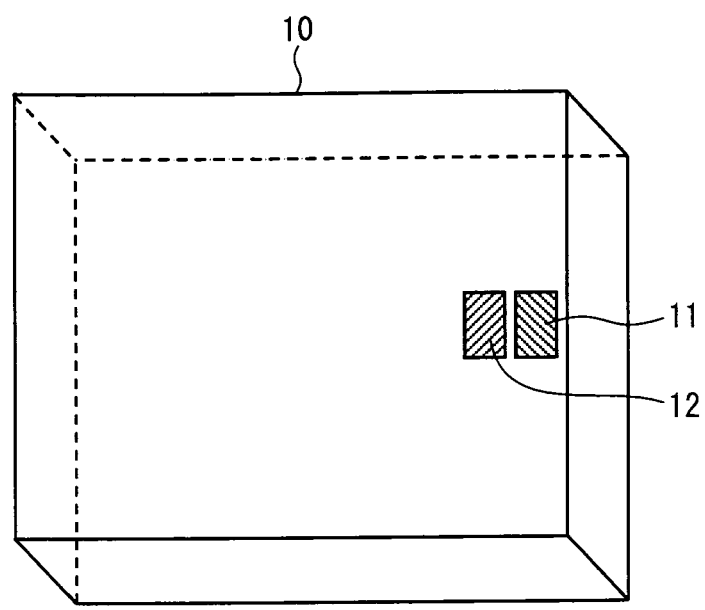
FIG. 3 is a diagram schematically illustrating an arrangement of a recording/reproduction head of the magnetic recording/reproduction device shown in FIG. 2.

The recording/reproduction head 10 applies magnetic fields to the magnetic recording medium 4 when the magnetic recording/reproduction device 5 records/reproduces information on the magnetic recording medium 4. This, for example, allows for determination of magnetization direction of a magnetic recording section 2 (i.e., recording section; described later) on a magnetic recording track of the magnetic recording medium 4. Specifically, as illustrated in FIG. 3, the recording/reproduction head 10 includes on its surface facing the magnetic recording medium 4 a magnetic recording element 11 (recording element) and a magnetic reproduction element (reproduction element) 12, both for mediums for perpendicular magnetic recording. FIG. 3 is a view schematically illustrating an arrangement of the recording/reproduction head 10 of the magnetic recording/reproduction device 5.

The magnetic recording element 11, when the magnetic recording/reproduction device 5 records information on the magnetic recording medium 4, applies a magnetic field to the magnetic recording medium 4, the magnetic field having an intensity that allows for the recording. Also, the magnetic reproduction element 12 reads the magnetization information from a magnetic recording section 2 of the magnetic recording medium 4.

The magnetic recording element 11 and the magnetic reproduction element 12 have a positional relationship with respect to a circumferential direction (track direction) as viewed from the magnetic recording medium 4, the positional relationship being described as follows: When the recording/reproduction head 10 passes through a given position above the magnetic recording medium 4 which is in spinning motion, the magnetic reproduction element 12 passes through the given position before the magnetic recording element 11.

As described above, the magnetic recording/reproduction device 5 controls: respective operations of the spindle 7 and the suspension 6; and the application of magnetic fields performed by the recording/reproduction head 10, so as to record/reproduce information at a target position on the magnetic recording medium 4.

More specifically, the magnetic recording/reproduction device 5 further includes a control section 41 which performs predetermined arithmetic processing for controlling various functions achieved by, e.g., the suspension 6 and the spindle 7. The control section 41 is formed with, e.g., a central processing unit (CPU). Further, the control section 41 includes, e.g., a signal identifying section 411, a difference calculating section 412, and a head position control section 413, in order to control the recording/reproduction head 10 when the magnetic recording/reproduction device 5 records/reproduces information on the magnetic recording medium 4 of the present embodiment.

The signal identifying section 411 compares, with preset signal amplitudes (described later), an amplitude of a signal indicating the magnetization information read by the magnetic reproduction element 12 from the magnetic recording medium 4, i.e., the magnetization information detected from the magnetic recording medium 4. The signal identifying section 411 then identifies, on the basis of a comparison result, the signal detected from the magnetic recording medium 4 either as a signal from a magnetic recording section 2 on a track followed by the recording/reproduction head 10 or as a signal from a magnetic recording section 2 on a track adjacent to the above track.

Further, the signal identifying section 411 refers to signal amplitudes (described below) stored in advance for region determination, so as to determine whether the signal detected by the magnetic reproduction element 12 is a signal detected from either a first region 31 or a second region 32. If the signal identifying section 411 determines that the signal detected by the magnetic reproduction element 12 is a signal detected from either the first region 31 or the second region 32, the signal identifying section 411 supplies the difference calculating section 412 with the amplitude of the signal.

The difference calculating section 412 (generating section) calculates a difference between the signals detected from the first region 31 and from the second region 32, respectively. The difference calculating section 412 then supplies the head position control section 413 with the difference. Stated differently, the difference calculating section 412 generates, when information is recorded on or reproduced from the first track Tr1 of the magnetic recording medium 4, a tracking error signal from the amplitude of a signal detected from each of the magnetic recording section 2 formed on the third track Tr3 in the first region 31 and the magnetic recording section 2 formed on the second track Tr2 in the second region 32. As described later (see, for example, the description of FIG. 5), the difference calculating section 412 uses as a tracking error signal a difference between the respective amplitudes of signals detected from the first region 31 and the second region 32.

The head position control section 413 (tracking control section) controls the voice coil motor 8 so as to control a position of the recording/reproduction head 10, thus allowing the recording/reproduction head 10 to track information on a predetermined track (i.e., a track to be followed for recording/reproduction). The head position control section 413 controls the position of the recording/reproduction head 10 by performing a distance detecting operation (described later) during, e.g., an initial operation of the magnetic recording/reproduction device 5.

Further, the head position control section 413 determines an amount of movement of the recording/reproduction head 10 in the radial direction on the basis of the difference supplied from the difference calculating section 412. When the difference is zero, the head position control section 413 does not shift the current position of the recording/reproduction head 10 (i.e., does not perform control of the position of the recording/reproduction head 10). On the other hand, when the difference is not zero, the head position control section 413 determines the amount of movement of the recording/reproduction head 10 (i.e., performs control of the position of the recording/reproduction head 10) by, e.g., referring to a table showing correspondence of the difference vs the movement amount. In other words, the head position control section 413 performs feedback control (tracking control) for the recording/reproduction head 10. When performing the feedback control, the head position control section 413 determines an off-track direction by referring, e.g., to positioning information and/or identification information.

Stated differently, the head position control section 413 performs tracking control in which the recording/reproduction head 10 is on track by controlling the position of the recording/reproduction head 10 so that the tracking error signal generated by the difference calculating section 412 has a desired value.

The magnetic recording/reproduction device 5 further includes a memory section 42 for storing, e.g., various data used in the control section 41 and data obtained by program execution. The memory section 42 is formed with, e.g., a volatile memory such as a random access memory (RAM) or a non-volatile memory such as a read-only memory (ROM) and a flash memory.

The memory section 42 stores, e.g., the following as the above various data or programs: the signal amplitudes allowing for determination of a track to be followed by the magnetic reproduction element 12; the signal amplitudes for region determination; the positioning information; and the table showing correspondence of the difference vs the amount of movement of the recording/reproduction head 10 in the radial direction.

The control of the magnetic recording medium 4 performed by the magnetic recording/reproduction device 5 is specified in a later description dealing with how to record/reproduce information on the magnetic recording medium 4. This description of a recording/reproduction method deals with control performed by the magnetic recording/reproduction device 5, the control being performed by means of reference by the control section 41 to the information stored in the memory section 42.

(Schematic Arrangement and Production Method of Magnetic Recording Medium)

Figure 1:
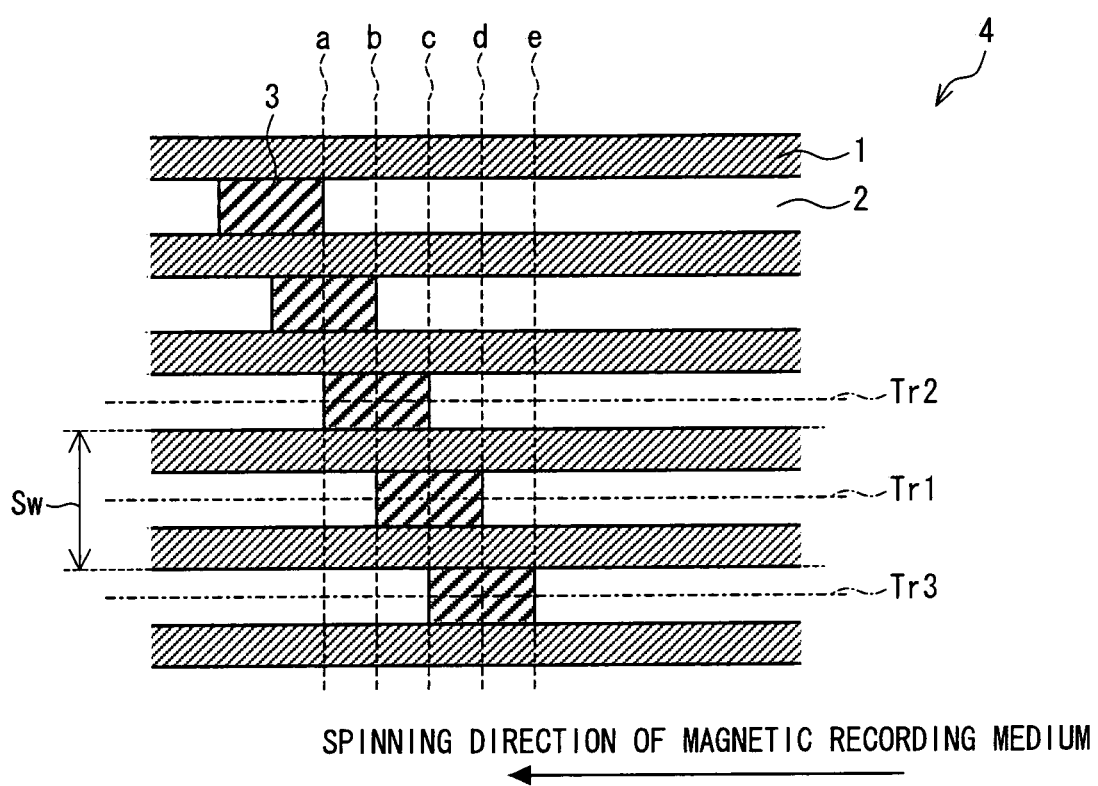
FIG. 1 is a view schematically illustrating an arrangement of a magnetic recording medium in accordance with an embodiment of the present invention.

With reference to FIG. 1, the following describes the magnetic recording medium 4 provided for the magnetic recording/reproduction device 5 shown in FIG. 2. FIG. 1 is a view schematically illustrating an arrangement of the magnetic recording medium 4 of the embodiment of the present invention.

The magnetic recording medium 4 is a discrete track medium including magnetic recording sections 2 magnetically separated by nonmagnetic guide sections (separating sections) 1. The magnetic recording sections 2 are concentric magnetic recording layers. Magnetic information in the magnetic recording sections 2 is recorded/reproduced by the magnetic recording/reproduction device 5. The magnetic recording sections 2 are separated by a predetermined track pitch (e.g., 50 nm). The magnetic recording layers included in the magnetic recording medium 4 of the present embodiment have a thickness of 30 nm. However, the thickness is not limited to this; it is simply required to range from 10 to 60 nm. Since each track on the magnetic recording medium 4 is a circumferential track, its circumferential direction corresponds to a track direction, while its radial direction corresponds to a cross-track direction.

Further, as illustrated in FIG. 1, the magnetic recording tracks magnetically separated by the nonmagnetic guide sections 1 each include not only magnetic recording sections 2 but also a non-magnetic-recording section (non-recording section) 3 (which is made of a nonmagnetic material and does not perform magnetic recording, similarly to the nonmagnetic guide sections). The non-magnetic-recording section 3 in each magnetic recording track is formed integrally with two nonmagnetic guide sections 1 adjacent to the magnetic recording track.

The non-magnetic-recording section 3 on each track shares borders with its two adjacent magnetic recording sections 2. The border located further ahead (further toward a left side in FIG. 1) along the spinning direction (moving direction) of the medium is herein referred to as a first border, whereas the border located further behind (further toward a right side in FIG. 1) along the spinning direction of the medium is herein referred to as a second border. These borders are positioned in an order described below.

Respective circumferential positions of borders listed below lie in the order as presented: a first border (circumferential position a) of a second track Tr2; a first border (circumferential position b) of a first track Tr1; a second border (circumferential position d) of the first track Tr1; and a second border (circumferential position e) of a third track Tr3. The second track Tr2 and the third track Tr3 have their respective second border and first border (circumferential position c) at a circumferential position between the first and second borders of the first track Tr1. As described above, according to the present embodiment, the second border of the second track Tr2 coincides with the first border of the third track Tr3 at the same circumferential position.

The above layout results in formation of at least one pair of the following regions: a first region (region defined by b and c) in which at least a portion of a non-magnetic-recording section 3 on the first track Tr1 coincides with at least a portion of a non-magnetic-recording section 3 on the second track Tr2 and a portion of a magnetic recording section 2 on the third track Tr3 at the same circumferential position; and a second region (region defined by c and d) in which at least a portion of the non-magnetic-recording section 3 on the first track Tr1 coincides with at least a portion of a non-magnetic-recording section 3 on the third track Tr3 and a portion of a magnetic recording section 2 on the second track Tr2 at the same circumferential position. Further, in the present embodiment, not only for the first track Tr1 but also for any other track, at least one pair of similar first and second regions are formed.

As illustrated in FIGS. 1 and 2, the magnetic recording medium 4 spins in the direction from the right side to the left side of the figures (as indicated by the respective arrows). The magnetic recording/reproduction device 5 thus detects signals from one magnetic recording section 2 after another on the magnetic recording medium 4, in an order from the left side to the right side of the figures. The magnetic recording medium 4 is a type of medium on which information is recorded as a result of, e.g., a magnetization having a direction perpendicular to an in-plane direction of the medium.

The following describes an example of a method for producing the magnetic recording medium 4. First, a magnetic layer is formed on a glass substrate. Then, resist is applied onto the magnetic layer. Next, a fine pattern is formed in the resist by electron-beam lithography. After that, a layer of a material for forming the magnetic recording sections 2 is formed on the resist having the fine pattern. The resist and the material for forming the magnetic recording sections 2, the material having been deposited on the resist, are then removed with use of an organic solvent. Next, a nonmagnetic layer is formed on the resultant substrate. In this method for producing the magnetic recording medium 4, portions of the magnetic layer are removed, the portions being deposited in regions corresponding to the nonmagnetic guide sections 1 and the non-magnetic-recording sections 3. The resultant substrate is polished on a surface having the nonmagnetic layer so that the magnetic recording sections 2 are exposed on the surface and that the surface is smooth. Finally, a lubricant is applied to the resultant substrate having the magnetic recording sections formed.

In the method for producing the magnetic recording medium 4, the material (magnetic layer) for forming the magnetic recording sections 2 may, for example, be Co, Pt, Fe, Ni, Cr, or Mn, or an alloy of any of these metals. The alloy may, for example, be CoPt, SmCo, CoCr, or TbFeCo. The fine pattern may be formed in the resist by, e.g., anodic oxidation, photolithography, or nano-imprint. The portions of the magnetic layer may be removed by, e.g., dry etching or ion milling other than the above method.

In the method for producing the magnetic recording medium 4, a magnetic recording surface (i.e., a surface having the magnetic recording sections 2) is formed only on one side of the magnetic recording medium 4. However, the method is not limited to this. The magnetic recording surface may be formed on each of both sides of the magnetic recording medium 4. In this case, the steps of the above production method are simply performed on both sides of the magnetic recording medium 4. In the case of forming the magnetic recording surface on each of both sides of the magnetic recording medium 4, the lubricant may be applied to both magnetic recording surfaces simultaneously.

(Method for Recording/Reproduction Information on Magnetic Recording Medium)

With reference to FIGS. 1 through 5, the following describes how the magnetic recording/reproduction device 5 records/reproduces magnetic information on the magnetic recording medium 4.

The magnetic reproduction element 12 of the present embodiment is so set as to determine that a signal at zero level is detected when no magnetization is detected. The magnetic reproduction element 12 determines that a positive signal is detected when detecting a magnetization having a direction in which FIG. 1 is viewed. The magnetic reproduction element 12 also determines that a negative signal is detected when detecting a magnetization having a direction opposite to the above direction. The magnetic reproduction element 12 determines that signals opposite in sign and equal in level are detected when detecting magnetizations opposite in direction and equal in intensity. The magnetic reproduction element 12 has a magnetization detection width Sw represented by the following Formula (A):

$$Sw = Mw + Gw \times 2 \tag{A},$$

where Mw and Gw represent respective widths of an individual magnetic recording section 2 and an individual non-magnetic guide section 1.

Specifically, the magnetization detection width Sw of the magnetic reproduction element 12 is equal to a combination of the respective widths of the first track Tr1 and its two adjacent nonmagnetic guide sections 1 which separate the first track Tr1 from other tracks.

The magnetic recording medium 4 records information in conformity with 1-7 run length limited (RLL) modulation. The magnetic recording medium 4 thus stores recording marks having lengths of 2T, 3T, . . . , and 8T, in correspondence with random signals. In the present embodiment, respective portions of the individual tracks, the portions lying side by side along the radial direction between the circumferential positions b and c, store recording marks of 6T, 2T, 3T, 6T, 4T, 3T, 2T, 2T, 6T, 4T, 2T, and 7T, respectively, in an inward order. The first recording mark of 6T has its magnetization in an upward direction, and the next recording mark of 2T has its magnetization in a downward direction. Respective magnetization directions of the subsequent recording marks are alternating upward and downward directions. Respective portions of the individual tracks, the portions lying side by side along the radial direction between the circumferential positions c and d, store recording marks of 3T, 2T, 6T, 3T, 2T, 2T, 4T, 7T, 6T, 6T, 2T, and 4T, respectively, in the inward order. The first recording mark of 3T has its magnetization in the upward direction, and the next recording mark of 2T has its magnetization in the downward direction. Respective magnetization directions of the subsequent recording marks are alternating upward and downward directions. The waveform includes rises and falls relative to its central level, i.e., its slice level 13, the rises and the falls corresponding to detection of magnetizations having the upward and downward directions, respectively. The sequence of signals is not limited to the above ones. The tracks may store random signals in any sequence.

Figure 5:
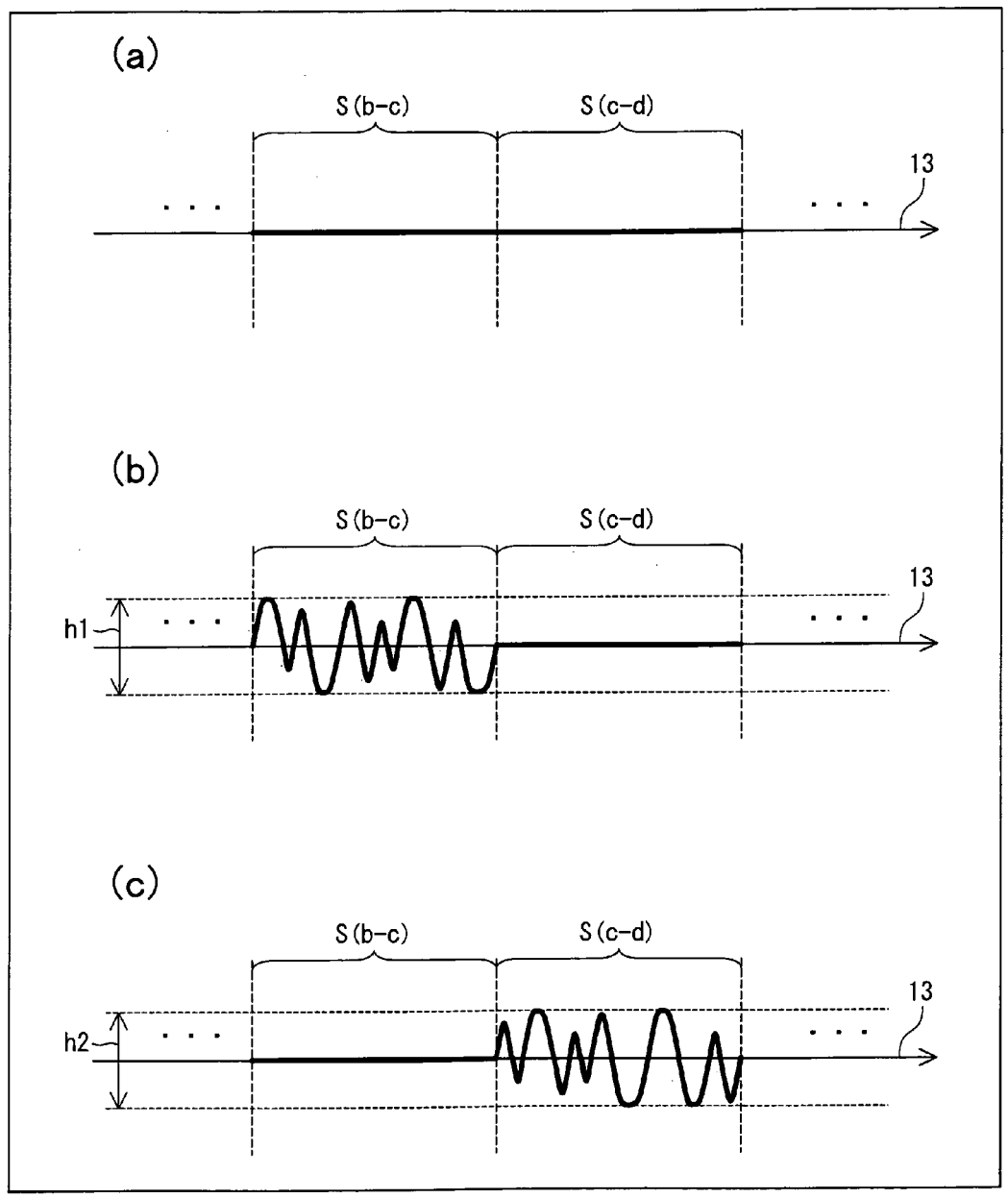
FIG. 5 is a diagram schematically illustrating signals detected by a magnetic reproduction element from the magnetic recording medium shown in FIG. 1, where (a) schematically illustrates signals detected when the recording/reproduction head is on track with respect to the track Tr1; and (b) and (c) schematically illustrate signals detected when the recording/reproduction head is slightly off track inwardly or outwardly, respectively.

The following describes: signals detected by the magnetic reproduction element at a time of reproduction; and how the magnetic reproduction element performs its tracking at the time of reproduction. (a) of FIG. 5 is a diagram schematically illustrating signals detected by the magnetic reproduction element 12 following the first track Tr1 from left to right of FIG. 1 at an on-track position so as to detect signals. (b) and (c) of FIG. 5 are diagrams illustrating signals detected by the magnetic reproduction element 12 being slightly off track in inward or outward direction, as illustrated in (a) and (b) of FIG. 4, respectively. The straight line 13 represents the slice level. The symbols S(b-c) and S(c-d) in each of (a) through (c)

of FIG. 5 represent signals detected between b and c and between c and d, respectively, while signals detected before and after them are not shown.

First, as illustrated in FIG. 1, when the magnetic reproduction head 10 follows at an on-track position the first track Tr1 of the magnetic recording medium 4 shown in FIG. 1, the magnetic reproduction element 12 detects the signals S(b-c) and S(c-d) with its center Cmr substantially along a center line of the first track Tr1. As illustrated in (a) of FIG. 5, the signals S(b-c) and S(c-d) both have their respective levels at zero (noise level), so that signals at the slice level are detected. The phrase "on track" refers to a state in which the recording/reproduction head 10 has its radial position substantially coincident with the center, along its radial direction, of a track, so that the magnetic recording/reproduction device 5 is able to read information stored in a target magnetic recording section 2. On the other hand, the phrase "off track" refers to a state in which the recording/reproduction head 10 has its radial position off the center, along the radial direction, of a track, so that the magnetic recording/reproduction device 5 is unlikely to correctly read information stored in a target magnetic recording section 2.

The following describes a case in which the recording/reproduction head 10 is off track relative to the track Tr1 of the magnetic recording medium 4. Unlike in the case shown in (a) of FIG. 5, the recording/reproduction head 10 detects, depending on its off-track direction, either the signal S(b-c) from a magnetic recording track positioned inwards from the first track Tr1, or the signal S(c-d) from a magnetic recording track positioned outwards from the first track Tr1.

When the recording/reproduction head 10 is slightly shifted inwardly (toward a bottom of FIG. 1) off the center of the first track Tr1 of FIG. 1 (see (a) of FIG. 4), i.e., when the center Cmr of the magnetic reproduction element 12 is shifted inwardly off the center line of the first track Tr1, the recording/reproduction head 10 detects, as illustrated in (b) of FIG. 5, the signal S(b-c) from the inwardly adjacent track between b and c (during which the signal has a maximum amplitude of h1). In this case, the feedback control is performed such that the recording/reproduction head 10 is shifted outwardly in its radial position so as to return to the on-track position with respect to the first track Tr1, thus reducing a level of the signal S(b-c) to zero (noise level). When the recording/reproduction head 10 is slightly shifted outwardly (toward a top of FIG. 1) off the center of the first track Tr1 of FIG. 1 (see (b) of FIG. 4), i.e., when the center Cmr of the magnetic reproduction element 12 is shifted outwardly off the center line of the first track Tr1, the recording/reproduction head 10 detects, as illustrated in (c) of FIG. 5, the signal S(c-d) from the outwardly adjacent track between c and d (during which the signal has a maximum amplitude of h2). In this case, the feedback control is performed such that the recording/reproduction head 10 is shifted inwardly in its radial position so as to return to the on-track position with respect to the first track Tr1, thus reducing a level of the signal S(c-d) to zero (noise level).

More specifically, a difference (h1-h2) between the respective maximum amplitudes h1 and h2 of the detected signals S(b-c) and S(c-d) is used as a tracking error signal, and the feedback control (tracking control) is performed so that the tracking error signal (h1−h2)=0. This allows the recording/reproduction head 10 to be at the on-track position. Using the difference between the maximum signal amplitudes as a tracking error signal as above even allows for cancellation of a signal amplitude at a noise level. The tracking error signal is not limited to the above; thus, it is simply required to be a signal which allows the recording/reproduction head 10 to be controlled so as to become closer to the on-track position as the value of the signal approaches a predetermined one. The tracking error signal may thus be, for example, $(h1^2-h2^2)$. Alternatively, when neither of the maximum amplitudes h1 and h2 is zero due to the signal amplitude at a noise level, the tracking error signal may be $(h1-h2)/(h1+h2)$.

As described above, even when the magnetic recording/reproduction device 5 is slightly off track relative to the first track Tr1, the feedback control may be performed so that both of the maximum amplitudes h1 and h2 are at zero level (noise level), thus allowing tracking control to be performed. The maximum amplitudes h1 and h2 are both smaller than a maximum signal amplitude of the first track Tr1 targeted for reproduction. Thus, cross talk between tracks, the cross talk being caused, e.g., when the magnetic recording/reproduction device 5 is slightly off track, is unlikely to cause reproduction errors or the like.

In the present embodiment, the tracks Tr2 and Tr3 adjacent to the first track Tr1 store in their magnetic recording sections 2 recording marks having random patterns conforming to the 1-7 RLL modulation. However, the present invention allows tracking control even when the tracks store recording marks having random patterns conforming to any other modulation system, or when the tracks have not stored recording marks having random patterns. For example, even when the magnetic recording medium 4 has a magnetization uniformly having a single direction (DC erase), the magnetic reproduction element 12 is capable of detecting signals from adjacent tracks when it is off track, thus allowing for tracking control. The magnetic reproduction element 12 is, as described above, simply required to be capable of detecting magnetic signals from tracks adjacent to a track targeted for reproduction or recording so that tracking control is performed in a manner similar to the above.

(How Off-Track Direction is Identified)

The following describes how the above-mentioned off-track direction is identified. As illustrated in FIG. 1, in the present embodiment, a track positioned further inwards (toward the bottom of in FIG. 1) has its non-magnetic-recording section 3 at a circumferential position further to the right of FIG. 1. As described above, each track includes its non-magnetic-recording section 3 having a circumferential position shifted in a specific direction from a circumferential position of a non-magnetic-recording section 3 included in a track that is adjacent to the above track on a specific side. This allows for regularity in the signal detection.

Specifically, for each track in FIG. 1, the following signals are detected in this successive order: (1) a signal (S(b-c)) from a magnetic recording section 2 only on an inwardly adjacent track and (2) a signal (S(c-d)) from a magnetic recording section 2 only on an outwardly adjacent track. According to the present embodiment, the second border of the second track Tr2 coincides with the first border of the third track Tr3 at the same circumferential position. Thus, the signals (1) and (2) are detected continuously. However, depending on a positional relationship between the second border of the second track Tr2 and the first border of the third track Tr3, another signal may be detected between the signals (1) and (2) (as in, e.g., later-described variation 1 of the magnetic recording medium). Even in this case, detecting both the signals (1) and (2) allows the off-track direction to be identified as the inward direction or the outward direction.

Conventional magnetic recording mediums include tracking servo patterns (burst patterns) each requiring at least four regions: two for detecting an off-track state, and the other two for identifying an off-track direction. In contrast, according to the present invention, it is the two regions for detecting an off-track state that identify an off-track direction, as described above. Thus, providing regions for detecting an off-track state in accordance with the present invention allows for further reduction of decrease in the storage of data regions, even when such regions have a length substantially equal to a length of the regions for detecting an off-track state in a conventional tracking servo pattern.

The above arrangement allows for detection of a tracking error signal on the basis of the signals that are detected from inwardly and outwardly adjacent tracks, respectively. Thus, high uniformity among the respective line widths (widths along the radial direction) of the nonmagnetic guide sections 1 allows for high precision in tracking. Linear or curvilinear patterns having a uniform width, the patterns being continuously formed by, e.g., electron beam (EB) lithography, are better in line-width uniformity than that resulting from precision in relative positions of the edges of multiple patterns lying at different positions. Therefore, the above arrangement allows tracking control to be performed with higher precision.

The non-magnetic-recording sections 3, i.e., the regions in which no magnetic recording is performed, are not necessarily made of the nonmagnetic material of which the nonmagnetic guide sections 1 are made. Thus, the non-magnetic-recording sections 3 may, for example, be made of a nonmagnetic material different from the nonmagnetic material of which the nonmagnetic guide section 1 is made. The non-magnetic-recording sections 3 may further be made of a paramagnetic material. Furthermore, the non-magnetic-recording sections 3 may be made of a ferromagnetic material different from the ferromagnetic material of which the magnetic recording sections 2 are made. In this case, tracking error signals are each detected as a value obtained as a result of addition of an offset value to a value of zero level (noise level) in the regions for detecting tracking error signals. This also allows tracking control to be performed on the basis of tracking error signals in a manner similar to the above.

According to the present embodiment, the magnetization detection width Sw of the magnetic reproduction element 12 is represented by the following:

Sw=Mw+Gw×2 . . . (A), where Mw and Gw represent the respective widths of an individual magnetic recording section 2 and an individual nonmagnetic guide section 1.

The magnetization detection width Sw is not limited to this.

However, if Sw<Mw, signals detected by means of magnetization of a track targeted for reproduction are low. Further, Sw<Mw would lead to low signals to be detected from the adjacent tracks when the magnetic reproduction element is at an off-track position (i.e., Sw<Mw would decrease detection sensitivity to tracking control signals). Consequently, Sw>Mw is preferable.

On the other hand, if Sw>Mw+Gw×2, magnetization information on the adjacent tracks is detected constantly, thus creating more noise components. Consequently, Sw<Mw+Gw×2 is preferably satisfied. In view of the above two points, the magnetization detection width Sw of the magnetic reproduction element 12 preferably satisfies Mw<Sw<Mw+Gw×2. This allows signals for tracking to be detected in an off-track state, and also allows high signals to be detected from a track targeted for reproduction. This allows for provision of a magnetic recording/reproduction device that causes few reproduction errors.

(Tracking at Time of Recording)

Control similar to the above may be performed when information is recorded. At a time of recording, the magnetic recording element 11 records information (i.e., generates a magnetic field so as to change a magnetization direction of a magnetic recording section) while the magnetic reproduction element 12 detects signals for tracking.

The present embodiment allows for setting a frequency of appearance of nonmagnetic sections on each track to any frequency. Thus, higher frequency of the appearance of the nonmagnetic sections allows signals for detecting an off-track state to be detected with higher frequency. In addition, the non-magnetic-recording sections 3 may be provided on the magnetic recording sections 2 (data recording regions). This eliminates the need to include regions dedicated to tracking servo patterns as conventionally, thus causing little reduction in the storage. This allows for performance of highly accurate tracking, and further allows for production of the magnetic recording/reproduction device 5 that causes little reduction in the storage of the data recording regions of the magnetic recording medium 4 and that causes few reproduction errors and few recording errors.

(Distance Detecting Operation)

The magnetic recording/reproduction device 5 preferably performs, in its initial operation (e.g., at a start of the magnetic recording/reproduction device 5), a distance detecting operation for detecting a radial distance between the magnetic recording element 11 and the magnetic reproduction element 12 included in the recording/reproduction head 10. Recording/reproduction heads 10 used in the magnetic recording/reproduction device 5 have an individual difference. Thus, the radial distance between the magnetic recording element 11 and the magnetic reproduction element 12 is likely to vary depending on each individual recording/reproduction head 10.

Thus, detecting the above distance in the initial operation allows the magnetic recording/reproduction device 5 to prevent the magnetic recording element 11 from being off track at the time of recording even when the distance has a value different from a predetermined value (e.g., the distance between the magnetic recording element 11 and the magnetic reproduction element 12 has a value of 0). In other words, the magnetic recording/reproduction device 5 prevents increase in the number of recording errors and reproduction errors arising from the recording errors, the recording errors being caused when the magnetic recording element 11 is in an off-track state due to the individual difference of the recording/reproduction head 10. The following describes an example of a possible initial operation of the magnetic recording/reproduction device 5 performed when the above distance is detected.

First, the magnetic recording/reproduction device 5 stores as r1 a radial position (with respect to the magnetic recording medium 4) at which the recording/reproduction head 10 is on track at the time of reproduction. Then, recording and reproduction operations are performed by the magnetic recording element 11 and the magnetic reproduction element 12, respectively, so that the magnetic recording/reproduction device 5 stores error rates obtained from the reproduction signals detected by the magnetic reproduction element 12. The magnetic recording/reproduction device 5 repeats the recording operation, the reproduction operation, and the error rate storing operation, for each radial position of the recording/reproduction head 10. The magnetic recording/reproduction device 5 stores not only the error rates obtained from reproduction signals but also radial positions of the recording/reproduction head 10, the radial positions being observed during the recording operation and corresponding to the error rates. The radial position of the recording/reproduction head 10 during the reproduction operation is r1.

Next, the magnetic recording/reproduction device 5 finds the smallest error rate from among the stored error rates so as to determine a radial position r2 of the recording/reproduction head 10, the radial position being observed during the recording operation and corresponding to the smallest error rate. More specifically, the magnetic recording/reproduction device 5 determines as r2 the radial position of the recording/reproduction head 10, the radial position being observed during the recording operation and corresponding to the smallest error rate, so as to determine as (r1−r2) the distance along the radial direction between the magnetic recording element 11 and the magnetic reproduction element 12, on the basis of the radial positions r1 and r2 determined as above.

The magnetic recording/reproduction device 5 stores the above-determined distance (r1−r2) so that the magnetic reproduction element 12 is off track by the same distance. The tracking control is performed in this state at the time of recording.

The initial operation of the magnetic recording/reproduction device 5 performed when the above distance is detected is not limited to the above. The distance along the radial direction between the magnetic recording element 11 and the magnetic reproduction element 12 may be detected as a difference between tracking error signals, as in an operation described below.

First, the magnetic recording/reproduction device 5 stores as TES1 a tracking error signal detected at a position at which the recording/reproduction head 10 is on track at the time of reproduction. Then, recording and reproduction operations are performed by the magnetic recording element 11 and the magnetic reproduction element 12, respectively, so that the magnetic recording/reproduction device 5 stores error rates obtained from reproduction signals detected by the magnetic reproduction element 12. The magnetic recording/reproduction device 5 repeats the recording operation, the reproduction operation, and the error rate storing operation, for each radial position of the recording/reproduction head 10. The magnetic recording/reproduction device 5 stores not only the error rates obtained from the reproduction signals but also tracking error signals detected by the magnetic reproduction element 12, the tracking error signals being observed during the recording operation and corresponding to the error rates. The radial position of the recording/reproduction head 10 during the reproduction operation is the position at which the tracking error signal TES1 is detected.

Next, the magnetic recording/reproduction device 5 finds the smallest error rate from among the stored error rates so as to determine a tracking error signal TES2 detected at a radial position of the recording/reproduction head 10, the radial position being observed during the recording operation and corresponding to the smallest error rate. More specifically, the magnetic recording/reproduction device 5 determines as TES2 the tracking error signal detected at the radial position of the recording/reproduction head 10, the radial position being observed during the recording operation and corresponding to the smallest error rate, so as to determine as (TES1−TES2) the distance along the radial direction between the magnetic recording element 11 and the magnetic reproduction element 12, on the basis of TES1 and TES2.

According to the above arrangement, the magnetic recording/reproduction device 5 stores the difference (TES2−TES1) between the tracking error signals so that the magnetic reproduction element 12 is off track in such a manner that the difference between the tracking error signals detected by the magnetic reproduction element is (TES2−TES1). The tracking control is performed in this state at the time of recording. As a result, the magnetic recording/reproduction device 5 prevents increase in the number of recording errors and reproduction errors arising from the recording errors, the recording errors being caused when the magnetic recording element 11 is in an off-track state due to the individual difference of the recording/reproduction head 10.

As described above, the magnetic recording/reproduction device 5 provided with the magnetic recording medium 4 is capable of performing tracking control at the circumferential positions at which the nonmagnetic sections are provided, on the basis of respective waveforms of signals detected from adjacent magnetic recording tracks. In other words, the above arrangement allows feedback control to be so performed on the radial position of the recording/reproduction head 10 that signals detected from both the first region (region between b and c) and the second region (region between c and d) are at zero level (noise level), thus allowing for tracking. This eliminates the need to provide, in the above magnetic recording medium 4, magnetic patterns dedicated to detection of tracking control signals. This in turn allows the magnetic recording/reproduction device 5 to accurately position the recording/reproduction head 10 while little reducing the data regions. Further, the magnetic recording medium 4 may include on each of its magnetic recording tracks a non-magnetic-recording section 3 having any appearance frequency. Higher frequency of the appearance of the non-magnetic-recording sections 3 allows the magnetic recording/reproduction device 5 to detect tracking control signals with higher frequency. The magnetic recording sections 2 are regions in which information is recordable; they do not merely function as tracking servo patterns.

[First Variation of Magnetic Recording Medium]

Figure 6:
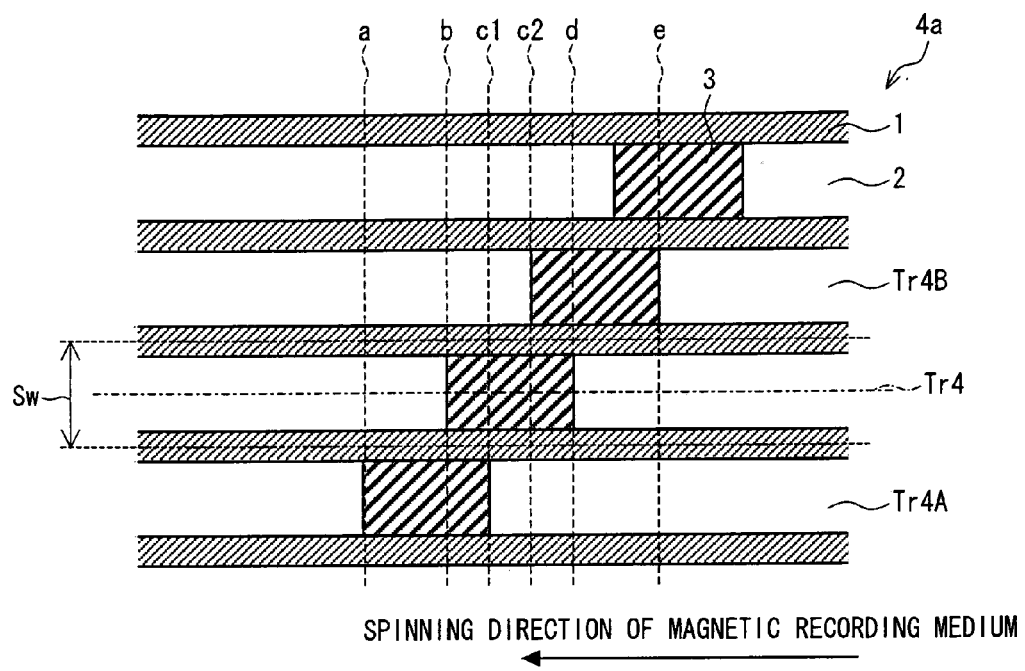
FIG. 6 is a view schematically illustrating an arrangement of a magnetic recording medium in accordance with an embodiment of the present invention.

The following describes a first variation of the magnetic recording medium 4 with reference to FIG. 6. FIG. 6 is a view schematically illustrating an arrangement of a magnetic recording medium 4a according to the present variation. The operation of the magnetic recording/reproduction device 5 and the method for producing the magnetic recording medium 4a are consistent with their respective equivalents described in Embodiment 1 above.

As in the magnetic recording medium 4 according to the above-described embodiment, the magnetic recording medium 4a is a discrete track medium including magnetic recording sections 2 magnetically separated by nonmagnetic guide sections 1. The magnetic recording sections 2 are concentric magnetic recording layers. Magnetic information in the magnetic recording sections 2 is recorded/reproduced by the magnetic recording/reproduction device 5. The magnetic recording sections 2 are separated by a predetermined track pitch (e.g., 40 nm). The magnetic recording layers included in the magnetic recording medium 4a of the present variation have a thickness of 20 nm. However, the thickness is not limited to this; it is simply required to range from 10 to 60 nm. As illustrated in FIG. 6, the magnetic recording tracks magnetically separated by the nonmagnetic guide sections 1 each include not only magnetic recording sections 2 but also a non-magnetic-recording section 3 (which is made of a nonmagnetic material and does not perform magnetic recording, similarly to the nonmagnetic guide sections 1).

The non-magnetic-recording section 3 on each track shares borders with its two adjacent magnetic recording sections 2. The border located further ahead (further toward a left side in FIG. 6) along a spinning direction of the medium is herein referred to as a first border, whereas the border located further behind (further toward a right side in FIG. 6) along the spinning direction of the medium is herein referred to as a second border. These borders are positioned in the following order: Respective circumferential positions of borders listed below lie in the order as presented: a first border (circumferential position a) of a second track Tr4A inwardly (toward a bottom side of FIG. 6) adjacent to a first track Tr4; a first border (circumferential position b) of the first track Tr4; a second border (circumferential position d) of the first track Tr4; and a second border (circumferential position e) of a third track Tr4B outwardly (toward a top side of FIG. 6) adjacent to the first track Tr4. The second track Tr4A and the third track Tr4B have their respective second border and first border (circumferential positions c1 and c2) at circumferential positions between the first and second borders of the first track Tr4, in the above order from ahead (from the left side of FIG. 6) along the spinning direction.

The present variation differs from Embodiment 1 in that tracks which are inwardly and outwardly adjacent to a target track are designated by the second track Tr4A and the third track Tr4B, respectively. Further, the second border (circumferential position c1) of the second track Tr4A and the first border (circumferential position c2) of the third track Tr4B differ from each other in their respective circumferential positions.

The above layout results in formation of at least one pair of the following regions: a first region (region defined by b and c1) in which at least a portion of a non-magnetic-recording section 3 on the first track Tr4 coincides with at least a portion of a non-magnetic-recording section 3 on the second track Tr4A and a portion of a magnetic recording section 2 on the third track Tr4B at the same circumferential position; and a second region (region defined by c2 and d) in which at least a portion of the non-magnetic-recording section 3 on the first track Tr4 coincides with at least a portion of a non-magnetic-recording section 3 on the third track Tr4B and a portion of a magnetic recording section 2 on the second track Tr4A at the same circumferential position. Further, in the present variation, not only for the first track Tr4 but also for any other track, at least one pair of similar first and second regions are formed.

As in Embodiment 1, detection of a signal in the region between b and c1 is recognized as occurrence of an outwardly off-track state, whereas detection of a signal in the region between c2 and d is recognized as occurrence of an inwardly off-track state. This allows feedback control to be performed so that the recording/reproduction head returns to an on-track position with respect to the track Tr4. In other words, even when the recording/reproduction head is slightly off track with respect to the track Tr4, the magnetic recording/reproduction device 5 is capable of performing feedback control so that the recording/reproduction head becomes on track with respect to the track Tr4.

More specifically, when a difference between (i) a "maximum amplitude of the signal detected from the region between b and c1" and (ii) a "maximum amplitude of the signal detected from the region between c2 and d" is used as a tracking error signal, the feedback control (tracking control) is so performed that the tracking error signal has a value of 0. This keeps the recording/reproduction head 10 on track.

A direction in which the recording/reproduction head is off track may be identified in a manner similar to the above. In the present variation, as illustrated in FIG. 6, a track positioned further inwards (toward a bottom of FIG. 6) has its non-magnetic-recording section 3 at a circumferential position further to a left of FIG. 6. As such, for each track in FIG. 6, the following signals are detected in this successive order: (1) a signal (detected in the region between b and c1) from a magnetic recording section 2 only on an outwardly adjacent track and (2) a signal (detected in the region between c2 and d) from a magnetic recording section 2 only on an inwardly adjacent track. As a result, detecting both the signals (1) and (2) allows the off-track direction to be identified as the inward direction or the outward direction. However, depending on a positional relationship between the second border of the second track Tr4A and the first border of the third track Tr4B, another signal may be detected between the signals (1) and (2). Such another signal is detected in the present variation in a region between c1 and c2.

As in Embodiment 1, the magnetic recording medium 4a of the present variation, even when having a narrow track pitch and a high linear recording density, allows the magnetic recording/reproduction device 5 to perform highly accurate tracking control, while little reducing recording regions. In other words, the magnetic recording medium 4a allows for provision of the magnetic recording/reproduction device 5, which causes few reproduction errors and few recording errors.

[Second Variation of Magnetic Recording Medium 4]

Figure 7:
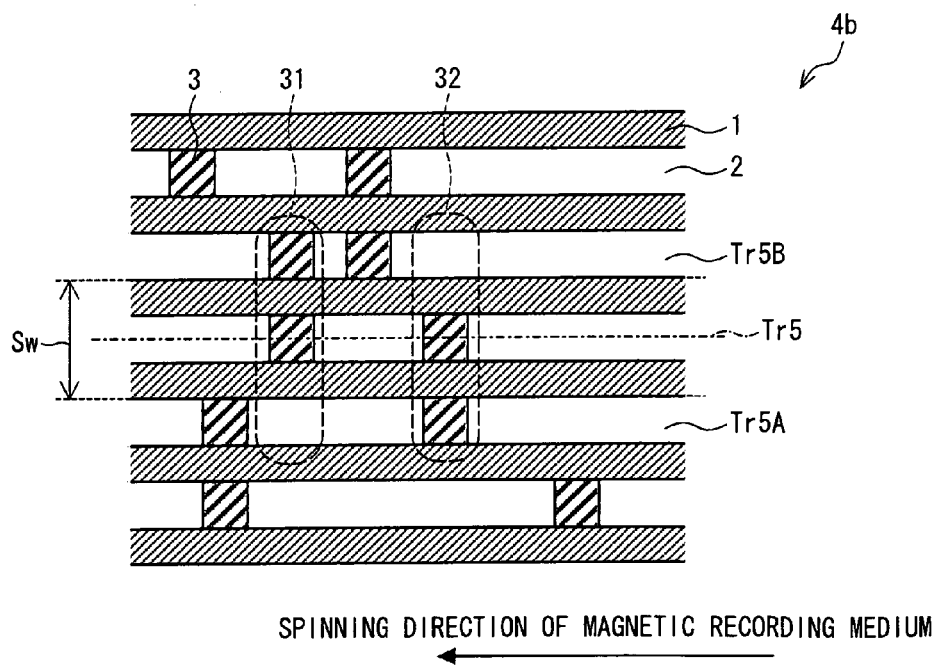
FIG. 7 is a view schematically illustrating an arrangement of a magnetic recording medium in accordance with an embodiment of the present invention.

The following describes a second variation of the magnetic recording medium 4 with reference to FIG. 7. FIG. 7 is a view schematically illustrating an arrangement of a magnetic recording medium 4b according to the present variation. The operation of the magnetic recording/reproduction device 5 and the method for producing the magnetic recording medium 4b are consistent with their respective equivalents described in Embodiment 1 above.

As in the magnetic recording medium 4 according to the above-described embodiments, the magnetic recording medium 4b is a discrete track medium including magnetic recording sections 2 magnetically separated by nonmagnetic guide sections 1. The magnetic recording sections 2 are concentric magnetic recording layers. Magnetic information in the magnetic recording sections 2 is recorded/reproduced by the magnetic recording/reproduction device 5. The magnetic recording sections 2 are separated by a predetermined track pitch (e.g., 45 nm). The magnetic recording layers included in the magnetic recording medium 4b of the present variation have a thickness of approximately 25 nm. However, the thickness is not limited to this; it is simply required to range from 10 to 60 nm.

As illustrated in FIG. 7, the magnetic recording tracks magnetically separated by the nonmagnetic guide sections 1 each include not only magnetic recording sections 2 but also non-magnetic-recording sections 3 (which are made of a non-magnetic material and do not perform magnetic recording, similarly to the nonmagnetic guide sections). The present variation differs from the Embodiment 1 and the first variation in that the non-magnetic-recording sections 3 are provided only in regions necessary to form later-described first and section regions.

When two tracks adjacent to a target first track are designated by a second track and a third track, respectively, the magnetic recording medium 4 has an arrangement including at least one pair of the following regions: a first region in which at least a portion of a non-magnetic-recording section 3 on the first track coincides with at least a portion of a non-magnetic-recording section 3 on the second track and a portion of a magnetic recording section 2 on the third track at the same circumferential position; and a second region in which at least a portion of a non-magnetic-recording section 3 on the first track coincides with at least a portion of a non-magnetic-recording section 3 on the third track and a portion of a magnetic recording section 2 on the second track at the same circumferential position. The following describes this in detail with the track Tr5 of FIG. 7 designated by the first track.

When tracks which are inwardly (toward a bottom of FIG. 7) and outwardly (toward a top of FIG. 7) adjacent to the first track Tr5 are designated by the second track Tr5A and the third track Tr5B, respectively, the magnetic recording medium 4 includes at least one pair of the following regions: a second region 32 including non-magnetic-recording sections 3 of the first and second tracks Tr5 and Tr5A and a portion of a magnetic recording section 2 formed on the third track Tr5B; and a first region 31 including non-magnetic-recording sections 3 of the first and third tracks Tr5 and Tr5B and a portion of a magnetic recording section 2 formed on the second track Tr5A. Further, not only for the track Tr5 but also for any other track, at least one pair of similar first and second regions are formed.

As in Embodiment 1, detection of a signal in the first region 31 is recognized as occurrence of an inwardly off-track state, whereas detection of a signal in the second region 32 is recognized as occurrence of an outwardly off-track state. This allows feedback control to be performed so that the recording/reproduction head returns to an on-track position with respect to the first track Tr5. In other words, even when the recording/reproduction head is slightly off track with respect to the first track Tr5, the magnetic recording/reproduction device 5 is capable of performing feedback control so that the recording/reproduction head becomes on track with respect to the first track Tr5.

A direction in which the recording/reproduction head is off track may be identified by causing the magnetic recording/reproduction device 5 to store in advance for each track a sequence of detection of: a region, such as the first region 31, in which a signal from an inwardly adjacent track is detected; and a region, such as the second region 32, in which a signal from an outwardly adjacent track is detected. In this case, for example, each track may include an address region. This allows the magnetic recording/reproduction device 5 to identify each track with use of the address and thus to recognize the sequence of appearance of: the region, such as the first region 31, which allows for detection of an inwardly off-track state; and the region, such as the second region 32, which allows for detection of an outwardly off-track state. As a result, the magnetic recording/reproduction device 5 is capable of identifying the off-track direction as the inward direction or the outward direction.

As in Embodiment 1, the magnetic recording medium 4b of the present variation, even when having a narrow track pitch and a high linear recording density, allows the magnetic recording/reproduction device 5 to perform highly accurate tracking control, while little reducing recording regions. In other words, the magnetic recording medium 4b allows for provision of the magnetic recording/reproduction device 5, which causes few reproduction errors and few recording errors.

[Third Variation of Magnetic Recording Medium 4]

Figure 8:
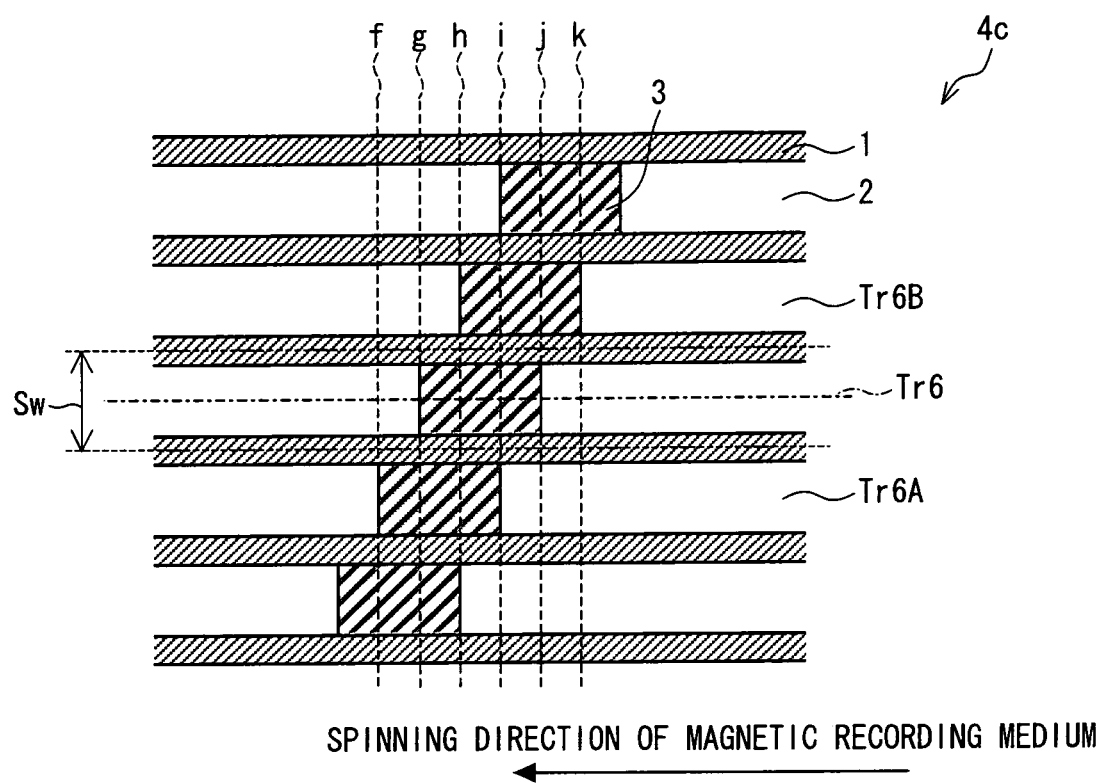
FIG. 8 is a view schematically illustrating an arrangement of a magnetic recording medium in accordance with an embodiment of the present invention.

The following describes a third variation of the magnetic recording medium 4 with reference to FIG. 8. FIG. 8 is a view schematically illustrating an arrangement of a magnetic recording medium 4c according to the present variation. The operation of the magnetic recording/reproduction device 5 and the method for producing the magnetic recording medium 4c are consistent with their respective equivalents described in Embodiment 1 above.

The magnetic recording medium 4c is a discrete track medium including magnetic recording sections 2 magnetically separated by nonmagnetic guide sections 1. The magnetic recording sections 2 are concentric magnetic recording layers. Magnetic information in the magnetic recording sections 2 is recorded/reproduced by the magnetic recording/reproduction device 5. The magnetic recording sections 2 are separated by a predetermined track pitch (e.g., 50 nm). The magnetic recording layers included in the magnetic recording medium 4c of the present variation have a thickness of 30 nm. However, the thickness is not limited to this; it is simply required to range from 10 to 60 nm.

For any given track (first track), its inwardly (toward a bottom of FIG. 8) adjacent track and an outwardly (toward a top of FIG. 8) adjacent track are herein referred to as a second track and a third track, respectively. Also, a non-magnetic-recording section 3 on each track shares borders with its two adjacent magnetic recording sections 2. The border located further ahead (further toward a left side in FIG. 8) along a spinning direction of the medium is herein referred to as a first border, whereas the border located further behind (further toward a right side in FIG. 8) along the spinning direction of the medium is herein referred to as a second border. These borders are positioned in an order described below.

Respective circumferential positions of borders listed below lie in the order as presented, from ahead (from the left side of FIG. 8) along the spinning direction: a first border (circumferential position f) of the second track Tr6A; a first border (circumferential position g) of the first track Tr6; a first border (circumferential position h) of the third track Tr6B; a second border (circumferential position i) of the second track Tr6A; a second border (circumferential position j) of the first track Tr6; and a second border (circumferential position k) of the third track Tr6B.

The above layout results in formation of at least one pair of the following regions: a first region (region defined by g and h) in which at least a portion of a non-magnetic-recording section 3 on the first track Tr6 coincides with at least a portion of a non-magnetic-recording section 3 on the second track Tr6A and a portion of a magnetic recording section 2 on the third track Tr6B at the same circumferential position; and a second region (region defined by i and j) in which at least a portion of the non-magnetic-recording section 3 on the first track Tr6 coincides with at least a portion of a non-magnetic-recording section 3 on the third track Tr6B and a portion of a magnetic recording section 2 on the second track Tr6A at the same circumferential position. In addition, the layout includes a specific region (region defined by h and i) between the first region (region defined by g and h) and the second region (region defined by i and j), the specific region including a portion of the non-magnetic-recording section 3 of each of the first to third tracks. Further, in the present variation, not only for the first track Tr6 but also for any other track, at least one pair of similar first and second regions are formed.

The following describes how tracking is performed. (a) of FIG. 10 is a diagram schematically illustrating signals detected by the magnetic reproduction element 12 following the first track Tr6 from left to right of FIG. 8 at an on-track position so as to detect signals. (b) and (c) of FIG. 10 are diagrams illustrating signals detected by the magnetic reproduction element 12 being slightly off track in inward or outward direction as illustrated in (a) and (b) of FIG. 9, respectively. The straight line 13 represents a slice level.

First, as illustrated in FIG. 8, when the magnetic reproduction head 10 follows at an on-track position the first track Tr6 of the magnetic recording medium 4c, the magnetic reproduction element 12 detects signals with its center Cmr substantially along a center line of the first track Tr6. As illustrated in (a) of FIG. 10, signals having the slice level are detected between g and j.

Figure 9:
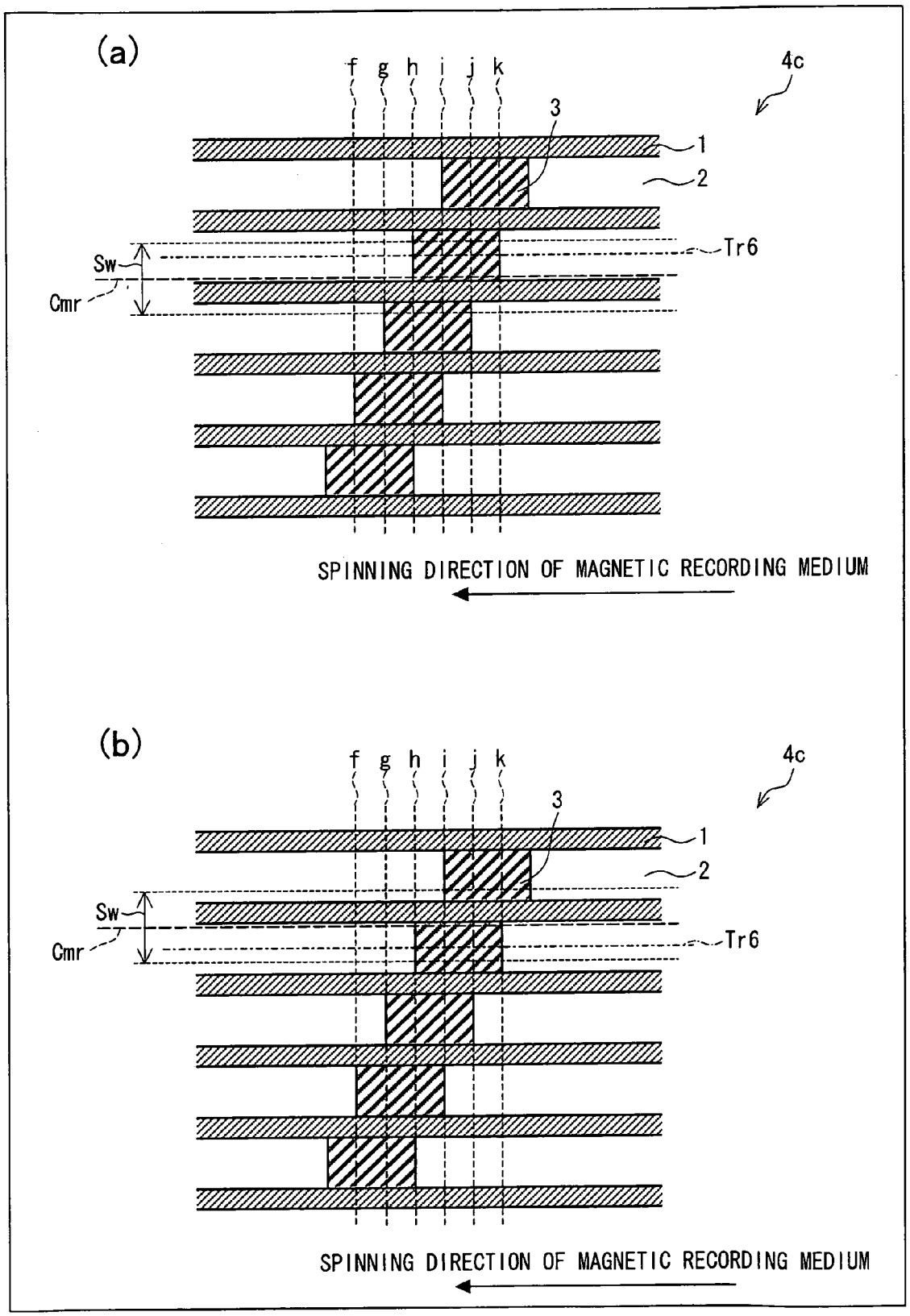
FIG. 9 is a view illustrating a state in which the recording/reproduction head is off track with respect to a track Tr6 at a time of reproducing information on the magnetic recording medium shown in FIG. 8, where (a) and (b) illustrate states in which the recording/reproduction head is slightly off track inwardly or outwardly, respectively.

When the recording/reproduction head 10 is slightly shifted inwardly (toward the bottom of FIG. 8) off the center of the first track Tr6 as illustrated in (a) of FIG. 9, i.e., when the center Cmr of the magnetic reproduction element 12 is shifted inwardly off the center line of the first track Tr6, the recording/reproduction head 10 detects, as illustrated in (b) of FIG. 10, a magnetization from the inwardly adjacent track between i and j. When the recording/reproduction head 10 is slightly shifted outwardly (toward the top of FIG. 8) off the center of the first track Tr6 as illustrated in (c) of FIG. 9, i.e., when the center Cmr of the magnetic reproduction element 12 is shifted outwardly off the center line of the first track Tr6, the recording/reproduction head 10 detects, as illustrated in (c) of FIG. 10, a magnetization from the outwardly adjacent track between g and h. The symbols S(g-h), S(h-i), and S(i-j) in each of (a) through (c) of FIG. 10 represent signals detected between g and h, between h and i, and between i and j, respectively, while signals detected before and after them are not shown.

When the recording/reproduction head 10 is at an on-track position with respect to the first track Tr6 of the magnetic recording medium 4c, the signals detected between g and j are at zero level (noise level) as illustrated in (a) of FIG. 10. In this case, the magnetic recording/reproduction device 5 is capable of reproducing information stored on the first track Tr6 without adjusting a radial position of the recording/reproduction head 10 with respect to the magnetic recording medium 4c.

When the recording/reproduction head 10 is off track relative to the first track Tr6 of the magnetic recording medium 4c, a signal is detected either between g and h or between i and j, unlike in (a) of FIG. 10.

More specifically, when the recording/reproduction head 10 is slightly shifted inwardly off the center line of the first track Tr6, the signal S(i-j) is detected, as illustrated in (b) of FIG. 10, the signal corresponding to a signal from the magnetic recording track inwardly adjacent to the first track Tr6. Thus, the magnetic recording/reproduction device 5 performs feedback control such that the recording/reproduction head 10 is moved back toward the center line of the first track Tr6 so as to have a radial position shifted outwardly off the center line of the first track Tr6, thus reducing a level of the detected signal to zero (noise level).

On the other hand, when the recording/reproduction head 10 is slightly shifted outwardly off the center line of the first track Tr6, the signal S(g-h) is detected, as illustrated in (c) of FIG. 10, the signal corresponding to a signal from the magnetic recording track outwardly adjacent to the first track Tr6. Thus, the magnetic recording/reproduction device 5 performs feedback control such that the recording/reproduction head 10 is moved back toward the center line of the first track Tr6 so as to have a radial position shifted inwardly off the center of the first track Tr6, thus reducing a level of the detected signal to zero (noise level). In other words, the magnetic recording/reproduction device 5 is capable of performing feedback control so that, even when the recording/reproduction head is slightly off track with respect to the first track Tr6, the recording/reproduction head returns to an on-track position with respect to the first track Tr6.

More specifically, when a difference between (i) a "maximum amplitude of the signal detected from the region between i and j" and (ii) a "maximum amplitude of the signal detected from the region between g and h" is used as a tracking error signal, the feedback control (tracking control) is so performed that the tracking error signal has a value of 0. This keeps the recording/reproduction head 10 on track.

The following describes how a direction in which the recording/reproduction head is off track is identified. In the present variation, as illustrated in FIG. 8, a track positioned further inwards (toward the bottom of FIG. 8) has its non-magnetic-recording section 3 at a circumferential position further ahead along the spinning direction (further to a left of FIG. 8). As described above, each track includes its non-magnetic-recording section 3 having a circumferential position shifted in a specific direction from a circumferential position of a non-magnetic-recording section 3 included in a track that is adjacent to the above track on a specific side. This allows for regularity in the signal detection. As such, for each track in FIG. 8, the following signals are detected continuously in this successive order: (1) a signal (S(g-h)) from a magnetic recording section 2 only on the outwardly adjacent track; (2) a signal (S(h-i)) at zero level (noise level) from non-magnetic-recording sections 3; and (3) a signal (S(i-j)) from a magnetic recording section 2 only on the inwardly adjacent track. As a result, detecting both the signals (1) and (3) allows the off-track direction to be identified as the inward direction or the outward direction.

Including, between the region between g and h and the region between i and j, the region (region between h and i) from which a signal at zero level is detected allows for detection of the signals S(g-h) and S(i-j) separated by a signal at zero level (noise level) when the magnetic reproduction head is in an off-track state. This further facilitates identifying tracking signals and thus allows tracking errors to occur less likely. In addition, even if variation in microfabrication has caused variation in the respective circumferential positions of the borders h and i, the signals S(g-h) and S(i-j) being detected while separated by a signal at zero level (noise level) further facilitates identifying tracking signals and thus allows tracking errors to less likely occur.

As in Embodiment 1, the magnetic recording medium 4c of the present variation, even when having a narrow track pitch and a high linear recording density, allows the magnetic recording/reproduction device 5 to perform highly accurate tracking control, while little reducing recording regions. In other words, the magnetic recording medium 4c allows for provision of the magnetic recording/reproduction device 5, which causes few reproduction errors and few recording errors.

[Fourth Variation of Magnetic Recording Medium 4]

Figure 11:
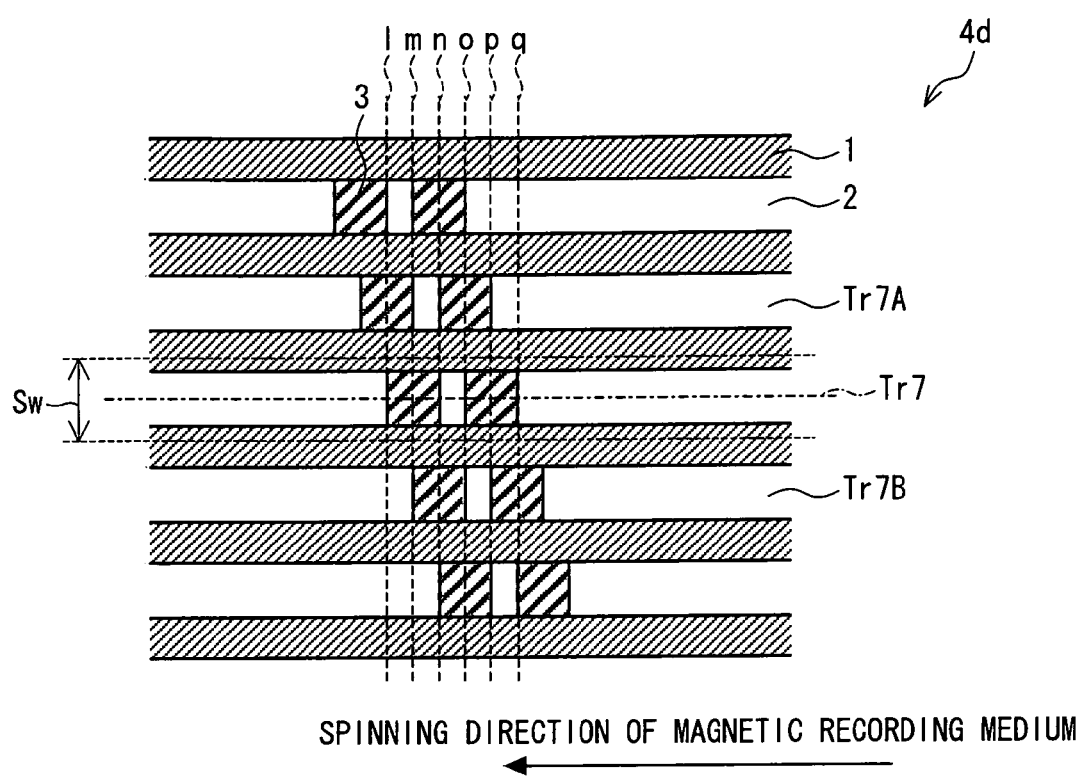
FIG. 11 is a view schematically illustrating an arrangement of a magnetic recording medium in accordance with an embodiment of the present invention.

The following describes a fourth variation of the magnetic recording medium 4 with reference to FIG. 11. FIG. 11 is a view schematically illustrating an arrangement of a magnetic recording medium 4d according to the present variation. The operation of the magnetic recording/reproduction device 5 and the method for producing the magnetic recording medium 4d are consistent with their respective equivalents described in Embodiment 1 above.

As in the magnetic recording medium 4 according to the above-described embodiments, the magnetic recording medium 4d is a discrete track medium including magnetic recording sections 2 magnetically separated by nonmagnetic guide sections 1. The magnetic recording sections 2 are concentric magnetic recording layers. Magnetic information in the magnetic recording sections 2 is recorded/reproduced by the magnetic recording/reproduction device 5. The magnetic recording sections 2 are separated by a predetermined track pitch (e.g., 40 nm). The magnetic recording layers included in the magnetic recording medium 4b of the present variation have a thickness of approximately 20 nm. However, the thickness is not limited to this; it is simply required to range from 10 to 60 nm.

As illustrated in FIG. 11, the magnetic recording tracks magnetically separated by the nonmagnetic guide sections 1 each include not only magnetic recording sections 2 but also non-magnetic-recording sections 3. Each magnetic recording track of the present variation includes two non-magnetic-recording sections 3 separated by a relatively short magnetic recording section 2.

The above layout results in formation of two pairs of the following regions: a first region (a region defined by l and m; a region defined by o and p) in which at least a portion of a non-magnetic-recording section 3 on a first track Tr7 coincides with at least a portion of a non-magnetic-recording section 3 on a second track Tr7A (outwardly adjacent to the first track Tr7) and a portion of a magnetic recording section 2 on a third track Tr7B (inwardly adjacent to the first track Tr7) at the same circumferential position; and a second region (a region defined by m and n; a region defined by p and q) in which at least a portion of a non-magnetic-recording section 3 on the first track Tr7 coincides with at least a portion of a non-magnetic-recording section 3 on the third track Tr7B and a portion of a magnetic recording section 2 on the second track Tr7A at the same circumferential position. Further, in the present variation, not only for the first track Tr7 but also for any other track, two pairs of similar first and second regions are formed.

Detection of a signal in the region between l and m or the region between o and p is recognized as occurrence of an inwardly off-track state, whereas detection of a signal in the region between m and n or the region between p and q is recognized as occurrence of an outwardly off-track state. This allows feedback control to be performed so that the recording/reproduction head returns to an on-track position with respect to the track Tr7. In other words, even when the recording/reproduction head is slightly off track with respect to the track Tr7, the magnetic recording/reproduction device 5 is capable of performing feedback control so that the recording/reproduction head becomes on track with respect to the track Tr7.

As illustrated in (a) of FIG. 12, the tracks may each include multiple non-magnetic-recording sections 3, and a frequency of appearance of them may be set to any frequency. This allows signals for detecting an off-track amount to be detected with high frequency. In addition, the non-magnetic-recording sections 3 may be provided on the data recording regions. This eliminates the need to include regions dedicated to tracking servo patterns as conventionally, thus causing little reduction in the storage. This allows for performance of highly accurate tracking, and further allows for production of the magnetic recording/reproduction device 5, which causes few reproduction errors and few recording errors, while little reducing the storage capacity of the data recording regions of the magnetic recording medium 4*d*.

Further, as illustrated in (b) of FIG. 12, the magnetic recording medium 4*b* may include a sector separating pattern 14 formed on it, or include an address information region.

[Fifth Variation of Magnetic Recording Medium 4]

Figure 13:
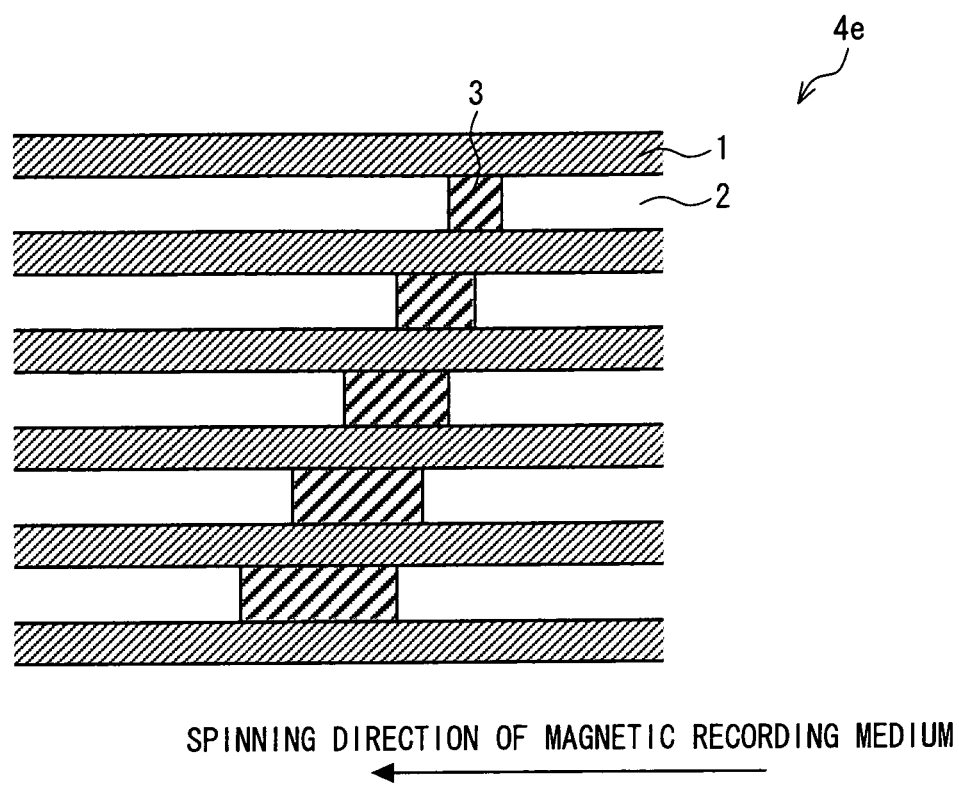
FIG. 13 is a view schematically illustrating an arrangement of a magnetic recording medium in accordance with an embodiment of the present invention.

The following describes a fifth variation of the magnetic recording medium 4 with reference to FIG. 13. FIG. 13 is a view schematically illustrating an arrangement of a magnetic recording medium 4*e* according to the present variation. The operation of the magnetic recording/reproduction device 5 and the method for producing the magnetic recording medium 4*e* are consistent with their respective equivalents described in Embodiment 1 above.

Non-magnetic-recording sections 3 may have respective lengths along a circumferential direction, the lengths varying depending on each track. For example, as illustrated in FIG. 13, a track further outward (further toward a top of FIG. 13) may have a shorter non-magnetic-recording section 3. Alternatively, a track further outward may, e.g., have a longer non-magnetic-recording section 3. This allows for identification of the tracks on the basis of the respective lengths of the non-magnetic-recording sections 3.

[Application as Dielectric Recording/Reproduction Device]

The present invention similarly allows for provision of a dielectric recording medium and a dielectric recording/reproduction device. In this case, the recording medium may be a dielectric recording medium including a dielectric recording section, whereas the recording/reproduction device is simply required to include a recording/reproduction head having an element (reproduction element) for detecting polarization direction and an element (recording element) for varying polarization direction.

[Application as Near-Field Light Recording/Reproduction Device]

The present invention similarly allows for provision of a near-field light recording medium and a near-field light recording/reproduction device. In this case, the recording medium may be a near-field light recording medium including near-field light recording tracks, whereas the recording/reproduction device is simply required to include a recording/reproduction head having a light-receiving element (reproduction element) for detecting scattering intensity of near-field light and an element (recording element) for varying scattering intensity of near-field light.

ALTERNATIVE DESCRIPTION OF THE PRESENT INVENTION

The recording medium of the present invention may preferably be arranged such that a first border of the second track, a first border of the first track, a second border of the first track, and a second border of the third track lie in this order along the circumferential direction; and a second border of the second track and a first border of the third track lie between the first and second borders of the first track along the circumferential direction, where the first and the second borders are borders between the non-recording section and the recording section included in each of the plurality of tracks, and the first border is followed by the second border in a direction in which the recording medium spins.

This arrangement causes a relative positional relationship between the regions below for each track to be identical to that of any other track: a region in which a signal is detected only from one of adjacent tracks; and a region in which a signal is detected only from the other adjacent track, different from the above region. This facilitates identifying a direction in which a recording/reproduction head is off track.

The recording medium of the present invention may preferably be arranged such that a first border of the second track, a first border of the first track, a first border of the third track, a second border of the second track, a second border of the first track, a second border of the third track lie in this order along the circumferential direction, where the first and the second borders are borders between the non-recording section and the recording section included in each of the plurality of tracks, and the first border is followed by the second border in a direction in which the recording medium spins.

This arrangement always creates a region in which a signal at zero level is detected. This in turn causes signals to be detected from the regions below separated by the region in which a signal at zero level is detected: a region in which a signal is detected only from one of adjacent tracks; and a region in which a signal is detected only from the other adjacent track, different from the above region. This further facilitates identifying tracking signals and thus allows tracking errors to occur less likely.

It is assumed that variation in microfabrication for production of the mediums has caused variation, among the mediums, in the respective positions of the above borders along the direction in which the tracks extend. Even in this case, signals from the regions below are detected in such a manner that the signals are separated by the signal at zero level: the region in which a signal is detected only from one of adjacent tracks; and the region in which a signal is detected only from the other adjacent track, different from the above region. This further facilitates identifying tracking signals and thus allows tracking errors to occur less likely.

A recording/reproduction device of the present invention includes: a recording and reproduction head including (i) a recording element for recording information by tracking a track on a recording medium and (ii) a reproduction element for reproducing information by tracking a track on a recording medium, the recording medium being a recording medium of the present invention, and the recording and reproduction device performing tracking control in recording or reproducing the information from the first track, so that the recording and reproduction head is on track, in such a manner that: the recording and reproduction device generates a tracking error signal from an amplitude of a signal detected from each of the recording section formed on the third track in the first region and the recording section formed on the second track in the second region; and the recording and reproduction device controls a position of the recording and reproduction head so that the tracking error signal has a desired value.

With the above arrangement, the recording/reproduction device of the present invention allows tracking control to be performed with respect to the first track followed by the recording/reproduction head, on the basis of a signal detected by the reproduction element only from an adjacent track and a signal detected by the reproduction element only from the other adjacent track, which is different from the above adjacent track.

As a result, the recording/reproduction device is capable of positioning the recording/reproduction head highly accurately with respect to the recording medium even when the recording medium includes no pattern dedicated to detection of tracking control signals. Therefore, the recording/reproduction device has an improved accuracy of positioning the recording/reproduction head (i.e., causes few recording errors and few reproduction errors) by recording/reproducing information on the above recording medium.

The above recording medium may include, on each track, multiple pairs of a region in which a signal is detected only from an adjacent track and a region in which a signal is detected only from the other adjacent track, which is different from the above adjacent track. In this case, the recording/reproduction device is capable of detecting tracking control signals with high frequency. This allows for highly frequent detection of signals for detecting an off-track state of the recording/reproduction head. In other words, the recording/reproduction device is capable of performing tracking control with respect to the recording medium with high frequency.

The recording/reproduction device of the present invention may be arranged such that Mw<Sw<Mw+2×Gw, where: Sw is a detection width in which the reproduction element performs the detection along a cross-track direction, which is a radial direction of the recording medium; and Mw and Gw are respective widths, along the cross-track direction, of (i) each individual one of the plurality of tracks and (ii) the separating section on the recording medium.

Setting the magnetization detection width Sw of the reproduction element to satisfy the above formula allows the reproduction element to detect the signal from the first track followed by the recording/reproduction head as the highest signal. Thus, cross talk is less likely to cause reproduction errors. The above setting also allows the reproduction element to detect tracking control signals with high sensitivity when the recording/reproduction head is off track. The recording/reproduction device is thus capable of performing tracking control with respect to the recording medium with high accuracy.

The recording/reproduction device of the present invention may be arranged such that the recording and reproduction device performs a distance detecting operation to detect a distance along a cross-track direction between the recording element and the reproduction element.

The above arrangement allows the recording/reproduction device to prevent the recording element from being off track at the time of recording even when the distance along the cross-track direction between the recording element and the reproduction element has a value different from a predetermined value (e.g., the distance between the recording element and the reproduction element has a value of 0). In other words, the recording/reproduction device prevents increase in the number of recording errors and reproduction errors arising from the recording errors, the recording errors being caused when the recording element is in an off-track state due to the individual difference of the recording/reproduction head.

The recording/reproduction device of the present invention may be arranged such that the distance detecting operation includes: repeatedly performing (i) a recording operation by the recording element, (ii) a reproduction operation by the reproduction element, and (iii) a storing operation to store error rates obtained from reproduction signals detected by the reproduction element, for each position of the recording and reproduction head along the cross-track direction of the recording medium; and, determining that the distance along the cross-track direction between the recording element and the reproduction element is (r1−r2), where r1 is that cross-track position on the recording medium at which the recording and reproduction head is when the recording and reproduction head is on track in reproduction, and r2 is that cross-track position on the recording medium at which the recording and reproduction head is when a recording operation that produces a desired error rate among the error rates thus recorded is performed.

The above arrangement causes the recording/reproduction device to store the distance determined as (r1−r2) so as to perform tracking control at a time of recording, with the reproduction element being off track by the above distance. As a result, the recording/reproduction device prevents increase in the number of recording errors and reproduction errors arising from the recording errors, the recording errors being caused when the recording element is in an off-track state due to the individual difference of the recording/reproduction head.

The recording/reproduction device of the present invention may be arranged such that the distance detecting operation is an operation by which the distance along the cross-track direction between the recording element and the reproduction element is detected as a difference between tracking error signals, the distance detecting operation including: repeatedly performing (i) a recording operation by the recording element, (ii) a reproduction operation by the reproduction element, and (iii) a storing operation to store error rates obtained from reproduction signals detected by the reproduction element, for each cross-track position of the recording and reproduction head along the cross-track direction of the recording medium; and, determining that the distance along the cross-track direction between the recording element and the reproduction element is a difference (TES1−TES2) between the tracking error signals, where TES1 is a tracking error signal detected by the recording and reproduction head when the recording and reproduction head is on track in reproduction, and TES2 is a tracking error signal detected by the recording and reproduction head when a recording operation that produces a desired error rate among the error rates thus recorded is performed.

The above arrangement causes the recording/reproduction device to store the difference (TES1−TES2) between the tracking error signals so as to perform tracking control at a time of recording, with the reproduction element being off track by the above distance. As a result, the recording/reproduction device prevents increase in the number of recording errors and reproduction errors arising from the recording errors, the recording errors being caused when the recording element is in an off-track state due to the individual difference of the recording/reproduction head.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The magnetic recording medium of the present invention is suitably applicable, e.g., as a high-density magnetic recording medium such as a discrete track medium. The magnetic recording/reproduction device of the present invention is suitably useful in recording/reproducing information on the above magnetic recording medium.

REFERENCE SIGNS LIST 1 nonmagnetic guide section (nonmagnetic separating section)
2 magnetic recording section
3 non-magnetic-recording section
4 magnetic recording medium
5 magnetic recording/reproduction device
6 suspension
7 spindle
8 voice coil motor
9 ramp mechanism
10 recording/reproduction head
11 magnetic recording element
12 magnetic reproduction element
13 zero level in detected signals
14 sector separating pattern
412 difference calculating section
413 head position control section
a to q circumferential position (track direction position) of a magnetic recording medium
Tr1 to Tr7, Tr4A to Tr7A, Tr4B to Tr7B track number (with a dashed-dotted line indicating the center line of the corresponding track)
Sw detection width of a magnetic reproduction element
Cmr center of a magnetic reproduction element
S(b-c), S(c-d), S(g-h) to S(i-j) a signal detected from a magnetic recording section
h1, h2 amplitude of a signal detected by a magnetic reproduction element

The invention claimed is:
1. A recording medium comprising:
a plurality of tracks evenly spaced from one another; and
a separating section between each track, for separating the plurality of tracks from one another,
each of the plurality of tracks including:
a recording section for recording information therein; and
a non-recording section made of nonmagnetic material in which no information is to be recorded; and
the non-recording section being formed continuously with two of the separating sections adjacent to the track,
the recording medium including at least one pair of a first region and a second region,
the first region being a region in which (i) at least a portion of a non-recording section on a first track, (ii) at least a portion of a non-recording section on a second track, and (iii) a portion of a recording section formed on a third track are positioned identically at a track direction position along a circumferential direction of the recording medium, and
a second region being a region in which (i) at least a portion of the non-recording section on the first track, (ii) at least a portion of a non-recording section on the third track, and (iii) a portion of a recording section formed on the second track are positioned identically at a track direction position along the circumferential direction of the recording medium,
where the first track is any given one of the plurality of tracks, the second track and the third track are two tracks provided side by side with the first track.

2. The recording medium according to claim 1, wherein:
a first border of the second track, a first border of the first track, a second border of the first track, and a second border of the third track lie in this order along the circumferential direction; and
a second border of the second track and a first border of the third track lie between the first and second borders of the first track along the circumferential direction,
where the first and the second borders are borders between the non-recording section and the recording section included in each of the plurality of tracks, and the first border is followed by the second border in a direction in which the recording medium spins.

3. The recording medium according to claim 1, wherein:
a first border of the second track, a first border of the first track, a first border of the third track, a second border of the second track, a second border of the first track, a second border of the third track lie in this order along the circumferential direction,
where the first and the second borders are borders between the non-recording section and the recording section included in each of the plurality of tracks, and the first border is followed by the second border in a direction in which the recording medium spins.

4. A recording and reproduction device comprising:
a recording and reproduction head including (i) a recording element for recording information by tracking a track on a recording medium and (ii) a reproduction element for reproducing information by tracking a track on a recording medium,
the recording medium comprising:
a plurality of tracks evenly spaced from one another; and
a separating section between each track, for separating the plurality of tracks from one another,
each of the plurality of tracks including:
a recording section for recording information therein; and
a non-recording section made of nonmagnetic material in which no information is to be recorded; and the non-recording section being formed continuously with two of the separating sections adjacent to the track, the recording medium including at least one pair of a first region and a second region, the first region being a region in which (i) at least a portion of a non-recording section on a first track, (ii) at least a portion of a non-recording section on a second track, and (iii) a portion of a recording section formed on a third track are positioned identically at a track direction position along a circumferential direction of the recording medium, and a second region being a region in which (i) at least a portion of the non-recording section on the first track, (ii) at least a portion of a non-recording section on the third track, and (iii) a portion of a recording section formed on the second track are positioned identically at a track direction position along the circumferential direction of the recording medium, where the first track is any given one of the plurality of tracks, the second track and the third track are two tracks provided side by side with the first track, and the recording and reproduction device performing tracking control in recording or reproducing the information from the first track, so that the recording and reproduction head is on track, in such a manner that:

the recording and reproduction device generates a tracking error signal from an amplitude of a signal detected from each of the recording section formed on the third track in the first region and the recording section formed on the second track in the second region; and the recording and reproduction device controls a position of the recording and reproduction head so that the tracking error signal has a desired value.

5. The recording and reproduction device according to claim 4, wherein Mw<Sw<Mw+2×Gw, where: Sw is a detection width in which the reproduction element performs the detection along a cross-track direction, which is a radial direction of the recording medium; and Mw and Gw are respective widths, along the cross-track direction, of (i) each individual one of the plurality of tracks and (ii) the separating section on the recording medium.

6. The recording and reproduction device according to claim 4, wherein the recording and reproduction device performs a distance detecting operation to detect a distance along a cross-track direction between the recording element and the reproduction element.

7. The recording and reproduction device according to claim 6, wherein the distance detecting operation includes:

repeatedly performing (i) a recording operation by the recording element, (ii) a reproduction operation by the reproduction element, and (iii) a storing operation to store error rates obtained from reproduction signals detected by the reproduction element, for each position of the recording and reproduction head along the cross-track direction of the recording medium; and, determining that the distance along the cross-track direction between the recording element and the reproduction element is (r1−r2), where r1 is that cross-track position on the recording medium at which the recording and reproduction head is when the recording and reproduction head is on track in reproduction, and r2 is that cross-track position on the recording medium at which the recording and reproduction head is when a recording operation that produces a desired error rate among the error rates thus recorded is performed.

8. The recording and reproduction device according to claim 6, wherein the distance detecting operation is an operation by which the distance along the cross-track direction between the recording element and the reproduction element is detected as a difference between tracking error signals, the distance detecting operation including:

repeatedly performing (i) a recording operation by the recording element, (ii) a reproduction operation by the reproduction element, and (iii) a storing operation to store error rates obtained from reproduction signals detected by the reproduction element, for each cross-track position of the recording and reproduction head along the cross-track direction of the recording medium; and, determining that the distance along the cross-track direction between the recording element and the reproduction element is a difference (TES1−TES2) between the tracking error signals, where TES1 is a tracking error signal detected by the recording and reproduction head when the recording and reproduction head is on track in reproduction, and TES2 is a tracking error signal detected by the recording and reproduction head when a recording operation that produces a desired error rate among the error rates thus recorded is performed.

9. A recording and reproduction device comprising:

a recording and reproduction head including (i) a recording element for recording information by tracking a track on a recording medium and (ii) a reproduction element for reproducing information by tracking a track on a recording medium, the recording medium comprising:

a plurality of tracks evenly spaced from one another; and a separating section between each track, for separating the plurality of tracks from one another, each of the plurality of tracks including:

a recording section for recording information therein; and a non-recording section made of nonmagnetic material in which no information is to be recorded; and the non-recording section being formed continuously with two of the separating sections adjacent to the track, the recording medium including at least one pair of a first region and a second region, the first region being a region in which (i) at least a portion of a non-recording section on a first track, (ii) at least a portion of a non-recording section on a second track, and (iii) a portion of a recording section formed on a third track are positioned identically at a track direction position along a circumferential direction of the recording medium, and a second region being a region in which (i) at least a portion of the non-recording section on the first track, (ii) at least a portion of a non-recording section on the third track, and (iii) a portion of a recording section formed on the second track are positioned identically at a track direction position along the circumferential direction of the recording medium, where the first track is any given one of the plurality of tracks, the second track and the third track are two tracks provided side by side with the first track, and the recording and reproduction device further comprising:

a generating section for generating, when the information is recorded on or reproduced from the first track of the recording medium, a tracking error signal from an amplitude of a signal detected from each of the recording section formed on the third track in the first region and the recording section formed on the second track in the second region; and a tracking control section for performing tracking control in which the recording and reproduction head is on track by controlling a position of the recording and reproduction head so that the tracking error signal generated by the generating section has a desired value.

* * * * *